United States Patent [19]
Jewett et al.

[11] Patent Number: 5,295,258
[45] Date of Patent: Mar. 15, 1994

[54] FAULT-TOLERANT COMPUTER SYSTEM WITH ONLINE RECOVERY AND REINTEGRATION OF REDUNDANT COMPONENTS

[75] Inventors: Douglas E. Jewett; Tom Bereiter; Brian Vetter; Randall G. Banton, all of Austin; Richard W. Cutts, Jr., Georgetown; Donald C. Westbrook, deceased, late of Austin, by Ben D. Friend, administrator; Kyran W. Fey, Jr., Pfluggerville; John Pozdro, Austin; Kenneth C. Debacker, Austin; Nikhil A. Mehta, Austin, all of Tex.

[73] Assignee: Tandem Computers Incorporated, Cupertino, Calif.

[21] Appl. No.: 461,250

[22] Filed: Jan. 5, 1990

Related U.S. Application Data

[63] Continuation-in-part of Ser. No. 455,218, Dec. 22, 1989, abandoned.

[51] Int. Cl.⁵ .................... G06F 11/18; G06F 11/20; G06F 12/16
[52] U.S. Cl. .................. 395/575; 364/228.3; 364/268.1; 364/268.3; 364/268.9; 364/269; 364/269.1; 364/285.2; 364/DIG. 1
[58] Field of Search .................. 371/7, 8.1, 9.1, 10.1, 371/68.1, 68.3, 12, 11.1, 11.3; 364/228.3, 268.4, 268.5, 268.6, 268.8, 269, 269.1, 285.2, 285.3, 268.1, 268.9

[56] References Cited

U.S. PATENT DOCUMENTS

| | | | |
|---|---|---|---|
| 3,602,900 | 8/1971 | Delaigue et al. | 340/172.5 |
| 3,665,173 | 5/1972 | Bouricius et al. | 371/9.1 |
| 3,681,578 | 8/1972 | Stevens | 235/153 |
| 3,735,356 | 5/1973 | Yates | 395/725 |
| 3,760,364 | 9/1973 | Yamauchi et al. | 364/200 |
| 3,761,884 | 9/1973 | Avsan et al. | 340/172.5 |
| 3,810,119 | 5/1974 | Zieve et al. | 340/172.5 |
| 3,828,321 | 8/1974 | Wilber et al. | 340/172.5 |

(List continued on next page.)

FOREIGN PATENT DOCUMENTS

| | | |
|---|---|---|
| 0104490 | 9/1983 | European Pat. Off. |
| 0141246 | 9/1984 | European Pat. Off. |
| 0286856 | 3/1988 | European Pat. Off. |
| 0316087 | 10/1988 | European Pat. Off. |
| 0299375 | 1/1989 | European Pat. Off. |
| WO85/02698 | 6/1985 | PCT Int'l Appl. |

OTHER PUBLICATIONS

"Fault Tolerant Systems Can Prevent Timing Problems" by John H. Wensley Computer Design, vol. 21 (1982) No. 11, Winchester, Mass.

(List continued on next page.)

Primary Examiner—Stephen M. Baker
Attorney, Agent, or Firm—Graham & James

[57] ABSTRACT

A computer system in a fault-tolerant configuration employs multiple identical CPUs executing the same instruction stream, with multiple, identical memory modules in the address space of the CPUs storing duplicates of the same data. The system detects faults in the CPUs and memory modules, and places a faulty unit offline while continuing to operate using the good units. The faulty unit can be replaced and reintegrated into the system without shutdown. The multiple CPUs are loosely synchronized, as by detecting events such as memory references and stalling any CPU ahead of others until all execute the function simultaneously; interrupts can be synchronized by ensuring that all CPUs implement the interrupt at the same point in their instruction stream. Memory references via the separate CPU-to-memory busses are voted at the three separate ports of each of the memory modules. I/O functions are implemented using two identical I/O busses, each of which is separately coupled to only one of the memory modules. A number of I/O processors are coupled to both I/O busses. I/O devices are accessed through a pair of identical (redundant) I/O processors, but only one is designated to actively control a given device; in case of failure of one I/O processor, however, an I/O device can be accessed by the other one without system shutdown.

29 Claims, 11 Drawing Sheets

U.S. PATENT DOCUMENTS

| | | | |
|---|---|---|---|
| 3,833,798 | 9/1974 | Huber et al. | 235/153 |
| 3,848,116 | 11/1974 | Moder et al. | 235/153 |
| 3,864,670 | 2/1975 | Inoue et al. | 364/200 |
| 3,921,149 | 11/1975 | Kreis et al. | 340/172.5 |
| 4,015,243 | 3/1977 | Kurpanek et al. | 340/1725 |
| 4,015,246 | 3/1977 | Hopkins, Jr. et al. | 340/172.5 |
| 4,034,347 | 7/1977 | Probert, Jr. | 364/200 |
| 4,187,538 | 2/1980 | Douglas et al. | 364/200 |
| 4,204,249 | 5/1980 | Dye et al. | 364/200 |
| 4,224,664 | 9/1980 | Trinchieri | 364/200 |
| 4,228,496 | 10/1980 | Katzman et al. | 364/200 |
| 4,234,920 | 11/1980 | Van Ness et al. | 364/200 |
| 4,253,144 | 2/1981 | Bellamy et al. | 364/200 |
| 4,257,097 | 3/1981 | Moran | 364/200 |
| 4,315,310 | 2/1982 | Bayliss et al. | 364/200 |
| 4,316,245 | 2/1982 | Luu et al. | 364/200 |
| 4,321,666 | 3/1982 | Tasar et al. | 364/200 |
| 4,330,826 | 5/1982 | Whiteside et al. | 364/200 |
| 4,358,823 | 11/1982 | McDonald et al. | 364/200 |
| 4,366,535 | 12/1982 | Cedolin et al. | 364/200 |
| 4,375,683 | 3/1983 | Wensley | 371/36 |
| 4,380,046 | 4/1983 | Fung | 364/200 |
| 4,392,196 | 7/1983 | Glenn et al. | 364/200 |
| 4,392,199 | 7/1983 | Schmitter et al. | 364/200 |
| 4,399,504 | 8/1983 | Obermarck et al. | 364/200 |
| 4,402,045 | 8/1983 | Kvel | 364/200 |
| 4,412,218 | 10/1983 | Niitsu | 340/825.56 |
| 4,412,281 | 10/1983 | Works | 364/200 |
| 4,414,624 | 11/1983 | Summer, Jr. et al. | 364/200 |
| 4,426,681 | 1/1984 | Bacot et al. | 364/200 |
| 4,430,707 | 2/1984 | Kim | 364/200 |
| 4,432,051 | 2/1984 | Bogaert et al. | 364/200 |
| 4,438,494 | 3/1984 | Budde et al. | 364/200 |
| 4,453,215 | 6/1984 | Reid | 364/200 |
| 4,455,605 | 6/1984 | Cormier et al. | 364/200 |
| 4,458,307 | 7/1984 | McAnlis et al. | 364/200 |
| 4,493,019 | 1/1985 | Kim et al. | 364/200 |
| 4,497,059 | 1/1985 | Smith | 371/36 |
| 4,541,094 | 9/1985 | Stiffler et al. | 371/68 |
| 4,564,903 | 1/1986 | Guyette et al. | 364/300 |
| 4,570,261 | 2/1986 | Maher | 371/16 |
| 4,577,272 | 3/1986 | Ballew et al. | 364/200 |
| 4,589,066 | 5/1986 | Lam et al. | 364/200 |
| 4,591,977 | 5/1986 | Nissen et al. | 364/200 |
| 4,597,084 | 6/1986 | Dynneson et al. | 371/51 |
| 4,607,365 | 8/1986 | Greig et al. | 371/8 |
| 4,608,688 | 8/1986 | Hansen et al. | 371/11 |
| 4,616,312 | 10/1986 | Uebel | 364/200 |
| 4,633,394 | 12/1986 | Georgiou et al. | 364/200 |
| 4,638,427 | 1/1987 | Martin | 364/200 |
| 4,644,498 | 2/1987 | Bedard et al. | 364/900 |
| 4,646,231 | 2/1987 | Green et al. | 364/200 |
| 4,648,035 | 3/1987 | Fava et al. | 364/200 |
| 4,654,857 | 3/1987 | Samson et al. | 371/68 |
| 4,661,900 | 4/1987 | Chen et al. | 364/200 |
| 4,667,287 | 5/1987 | Allen et al. | 364/200 |
| 4,672,535 | 6/1987 | Katzman et al. | 364/200 |
| 4,683,570 | 7/1987 | Bedard et al. | 371/36 |
| 4,703,452 | 10/1987 | Abrant et al. | 364/900 |
| 4,709,325 | 11/1987 | Yajima | 364/200 |
| 4,733,353 | 3/1988 | Jaswa | 364/200 |
| 4,751,639 | 6/1988 | Corcoran et al. | 364/200 |
| 4,754,397 | 6/1988 | Varaiya et al. | 364/200 |
| 4,757,442 | 7/1988 | Sakata | 364/200 |
| 4,757,505 | 7/1988 | Marrington et al. | 371/66 |
| 4,763,333 | 8/1988 | Byrd | 371/66 |
| 4,774,709 | 9/1988 | Tulplue et al. | 371/11 |
| 4,779,008 | 10/1988 | Kessels | 307/269 |
| 4,783,731 | 11/1988 | Miyzaki et al. | 364/200 |
| 4,783,733 | 11/1988 | Greig et al. | 364/200 |
| 4,785,453 | 11/1988 | Chandran et al. | 371/68 |
| 4,794,601 | 12/1988 | Kikuchi | 371/36 |
| 4,799,140 | 1/1989 | Dietz et al. | 364/140 |
| 4,800,462 | 1/1989 | Zacher et al. | 361/413 |
| 4,805,107 | 2/1989 | Kieckhafer et al. | 364/200 |
| 4,819,159 | 4/1989 | Shipley et al. | 364/200 |
| 4,823,256 | 4/1989 | Bishop et al. | 364/200 |
| 4,827,401 | 5/1989 | Hrustich et al. | 364/200 |
| 4,831,520 | 5/1989 | Rubinfeld et al. | 364/200 |
| 4,845,419 | 7/1989 | Hacker | 320/39 |
| 4,847,837 | 7/1989 | Morales et al. | 371/8 |
| 4,849,979 | 7/1989 | Maccianti et al. | 371/68 |
| 4,853,872 | 8/1989 | Shimoi | 364/300 |
| 4,860,333 | 8/1989 | Bitzinger et al. | 379/10 |
| 4,868,818 | 9/1989 | Madan et al. | 371/11.3 |
| 4,868,826 | 9/1989 | Smith et al. | 371/9.1 |
| 4,868,832 | 9/1989 | Marrington et al. | 371/66 |
| 4,873,685 | 10/1989 | Millis, Jr. | 371/3 |

(List continued on next page.)

OTHER PUBLICATIONS

"Comparative Architecture of High-Availability Computer Systems" by McCluskey & Ogus: Inst. of Electrical & Electronics Engineers, Spring Conf. 14; 1977.

"Architectural Description of a Fault-Tolerant Multiprocessor Engineering Prototype" by Smith and Hopkins; 8th Ann. Int'l Conf. on Fault-Tolerant Computing Jun., 1978.

(List continued on next page.)

U.S. PATENT DOCUMENTS

| | | | |
|---|---|---|---|
| 4,879,716 | 11/1989 | McNally et al. | 371/8.2 |
| 4,907,232 | 3/1990 | Harper et al. | 371/36 |
| 4,912,698 | 3/1990 | Bitzinger et al. | 370/13 |
| 4,914,657 | 4/1990 | Walter et al. | 371/11.3 |
| 4,933,940 | 6/1990 | Walter et al. | 371/9.1 |
| 4,937,741 | 6/1990 | Harper et al. | 364/200 |
| 4,959,774 | 9/1990 | Davis | 364/200 |
| 4,965,717 | 10/1990 | Cutts, Jr. et al. | 364/200 |
| 5,018,148 | 5/1991 | Patel et al. | 371/66 |
| 5,020,059 | 5/1991 | Gorin et al. | 371/11.3 |

OTHER PUBLICATIONS

E. I. Cohen et al., "Storage Hierarchies", 1989, IBM Systems Journal, vol. 28, No. 1, pp. 62–76.

Davies & Wakerly, "Synchronization and Matching Redundant Systems", IEEE Trans. on Computers, Jun. 1978, pp. 531–539.

Yoneda et al., "Implementation of Interrupt Handler for Loosely-Synchronized TMR Systems," Proc. 15th Ann. Symp. on Fault-Tolerant Computing Jun. 1985, p. 2.

McConnel and Siewicrek, "Synchronizing and Voting", IEEE Trans. on Computers, Feb. 1981, pp. 161–164.

Smith, "High-Performance Fault Tolerant Real Time Computer Architecture Proc. 16th Annual Symposium on Fault-Tolerant Computing", Jul. 1986, pp. 14–19.

Weinstock, "SIFT: System Design and Implementation", Proc. 10th Annual Symposium on Fault-Tolerant Computing, Oct. 1980, pp. 75–77.

Philip H. Enslow, Jr., "Multiprocessors and Parallel Processing", Pub. by John Wiley & Sons; 1974; pp. 28–33.

Hopkins, Jr., "A Fault-Tolerant Information Processing Concept for Space Vehicles", IEEE Trans. on Computers, Nov. 1971, pp. 1394–1403.

Sklaroff, "Redundancy Management Technique for Space Shuttle Computers", IBM J. of Res. Develop., Jan. 1976, pp. 20–28.

Kilmer et al., "Comparison of Synchronization Techniques for Redundant Computer Sets", Report by IBM Fed. Sys. Div., dated Mar. 22, 1974, pp. 1–2.

"Computer System Isolates Faults", Computer Design, Nov. 1983 7 pages (reprint).

Product Brochure, "Tolerant Systems 'Eternity TM Series' Computer Systems"; Jan. 1984; 6 pages.

Product Brochure, "BiiN 60 TM System-Technical Overview" dated 1988; 23 pages.

Product Brochure, "NCR 7800 System-Technical Overview"; copyright 1986, 44 pages.

S. Chang, "Multiple-Read Single Write Memory and its Applications", *IEEE Transactions on Computers*, Aug. 1990, pp. 689–694.

D. Nadel, "Closely Coupled asynchronous hierarchical and parallel processing in an open architecture," The 12th Annual International Symposium on Computer Architecture, Conference Proceedings, Boston, Mass., Jun. 17–19, 1985 pp. 215–220.

Malaiya, Y., "Fault-Tolerance in Multiple Processor Systems", *Proc. IEEE Int'l. Conf. on Circuits and Computers*, Oct. 1–3, 1980, Port Chester, N.Y., pp. 710–716.

Wensley, J., "Fault-tolerant computers ensure reliable industrial controls", *Electronic Design*, Jun. 25, 1981, pp. 129–135.

Boggs, D., "Fault Tolerant Computer Enhances Control System Reliability", *Control Engineering*, Sep. 1981, pp. 129–132.

Wensley, J., "Industrial-control system does things in threes for safety", *Electronics*, Jan. 27, 1983, pp. 98–102.

Yoneda, T., et al., "Implementation of Interrupt Handler for Loosely-Synchronized TMR Systems", 15th Ann. Symp. on Fault-Tolerant Computing, Jun. 1985, pp. 246–251.

Bates, K., et al., "Shadowing Boosts System Reliability", *Computer Design*, Apr. 1985, pp. 129–137.

Kirrmann, H., "Fault Tolerance in Process Control: An Overview and Examples of European Products", *IEEE Micro*, Oct. 1987, pp. 27–50.

Chester, M., "Fault-tolerant computers mature", *Systems & Software*, Mar. 1985, pp. 117–129.

Frison, S. G., et al., "Interactive Consistency and Its Impact on the Design of TMR Systems," August Systems, Inc., Proc. 12th Ann. Symp. on F.T. Computing, Jun. 1982.

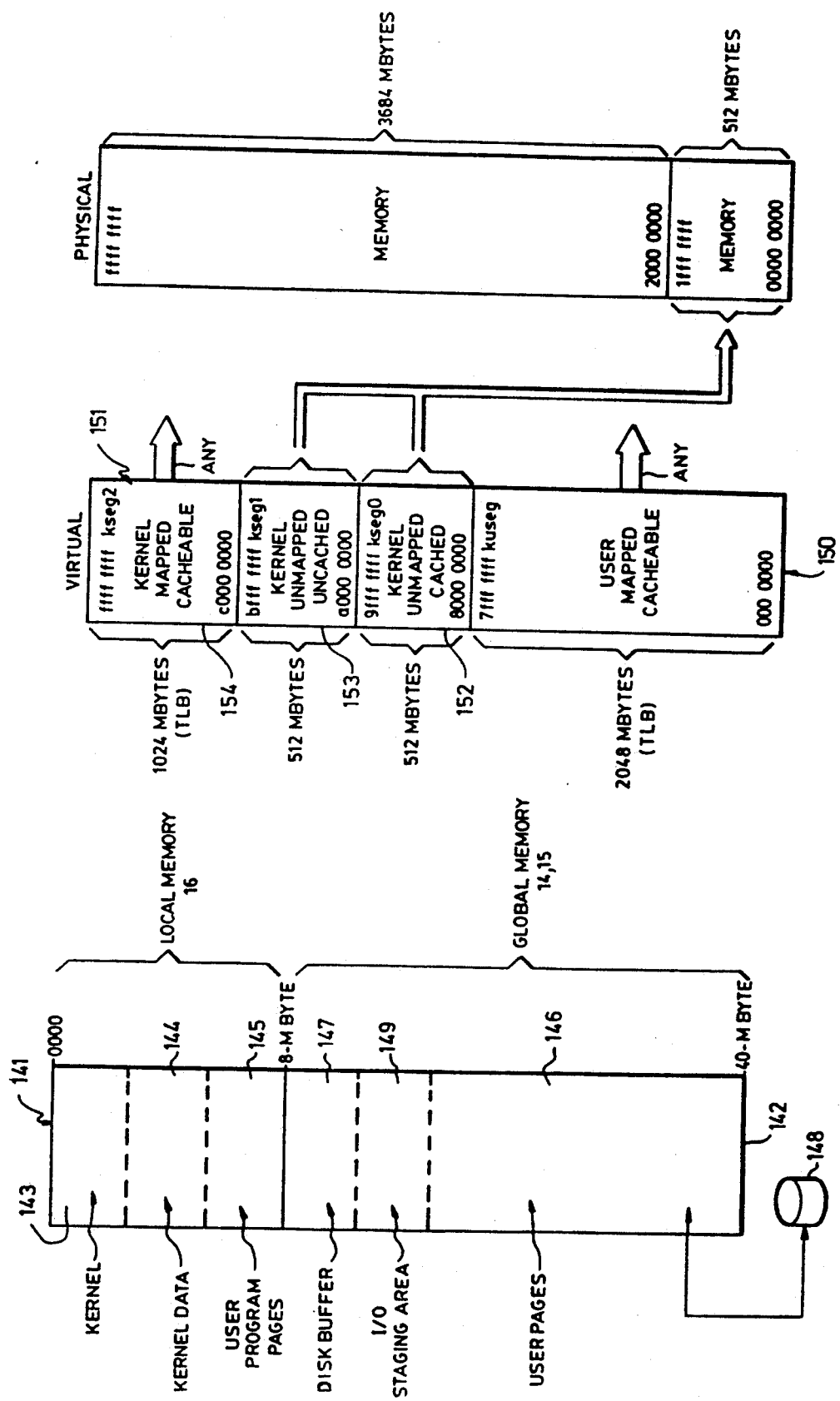

FAULT-TOLERANT COMPUTER SYSTEM WITH ONLINE RECOVERY AND REINTEGRATION OF REDUNDANT COMPONENTS

RELATED CASES

This application is a continuation-in-part of application Ser. No. 07/455,218, now abandoned, filed Dec. 22, 1989.

This application discloses subject matter also disclosed in copending U.S. patent applications Ser. Nos. 07/455,127, now abandoned and 07/455,065, now abandoned, filed Dec. 22, 1989, Ser. Nos. 282,469, 282,538 now abandoned, 282,540, now abandoned, 282,629, now abandoned, 283,139, now abandoned, and 283,141, now abandoned, filed Dec. 9, 1988, and Ser. Nos. 283,573 now U.S. Pat. No. 4,965,717 and 283,574, now abandoned, filed Dec. 13, 1988, and further discloses subject matter also disclosed in prior copending application Ser. No. 118,503, filed Nov. 9, 1987, now abandoned, all of said applications being assigned to Tandem Computers Incorporated, the assignee of this invention.

BACKGROUND OF THE INVENTION

This invention relates to computer systems, and more particularly to detection and reintegration of faulty components in a fault-tolerant multiprocessor system.

Highly reliable digital processing is achieved in various computer architectures employing redundancy. For example, TMR (triple modular redundancy) systems may employ three CPUs executing the same instruction stream, along with three separate main memory units and separate I/O devices which duplicate functions, so if one of each type of element fails, the system continues to operate. Another fault-tolerant type of system is shown in U.S. Pat. No. 4,228,496, issued to Katzman et al, for "Multiprocessor System", assigned to Tandem Computers Incorporated. Various methods have been used for synchronizing the units in redundant systems; for example, in said prior application Ser. No. 118,503, filed Nov. 9, 1987, by R. W. Horst, for "Method and Apparatus for Synchronizing a Plurality of Processors", also assigned to Tandem Computers Incorporated, a method of "loose" synchronizing is disclosed, in contrast to other systems which have employed a lock-step synchronization using a single clock, as shown in U.S. Pat. No. 4,453,215 for "Central Processing Apparatus for Fault-Tolerant Computing", assigned to Stratus Computer, Inc. A technique called "synchronization voting" is disclosed by Davies & Wakerly in "Synchronization and Matching in Redundant Systems", IEEE Transactions on Computers June 1978, pp. 531-539. A method for interrupt synchronization in redundant fault-tolerant systems is disclosed by Yondea et al in Proceeding of 15th Annual Symposium on Fault-Tolerant Computing, June 1985, pp. 246-251, "Implementation of Interrupt Handler for Loosely Synchronized TMR Systems". U.S. Pat. No. 4,644,498 for "Fault-Tolerant Real Time Clock" discloses a triple modular redundant clock configuration for use in a TMR computer system. U.S. Pat. No. 4,733,353 for "Frame Synchronization of Multiply Redundant Computers" discloses a synchronization method using separately-clocked CPUs which are periodically synchronized by executing a synch frame.

As high-performance microprocessor devices have become available, using higher clock speeds and providing greater capabilities, and as other elements of computer systems such as memory, disk drives, and the like have correspondingly become less expensive and of greater capability, the performance and cost of high-reliability processors have been required to follow the same trends. In addition, standardization on a few operating systems in the computer industry in general has vastly increased the availability of applications software, so a similar demand is made on the field of high-reliability systems; i.e., a standard operating system must be available.

It is therefore the principal object of this invention to provide an improved high-reliability computer system, particularly of the fault-tolerant type. Another object is to provide an improved redundant, fault-tolerant type of computing system, and one in which high performance and reduced cost are both possible; particularly, it is preferable that the improved system avoid the performance burdens usually associated with highly redundant systems. A further object is to provide a high-reliability computer system in which the performance, measured in reliability as well as speed and software compatibility, is improved but yet at a cost comparable to other alternatives of lower performance. An additional object is to provide a high-reliability computer system which is capable of executing an operating system which uses virtual memory management with demand paging, and having protected (supervisory or "kernel") mode; particularly an operating system also permitting execution of multiple processes; all at a high level of performance. Still another object is to provide a high-reliability redundant computer system which is capable of detecting faulty system components and placing them off-line, then reintegrating repaired system components without shutting down the system.

SUMMARY OF THE INVENTION

In accordance with one embodiment of the invention, a computer system employs three identical CPUs typically executing the same instruction stream, and has two identical, self-checking memory modules storing duplicates of the same data. Memory references by the three CPUs are made by three separate busses connected to three separate ports of each of the two memory modules. In order to avoid imposing the performance burden of fault-tolerant operation on the CPUs themselves, and imposing the expense, complexity and timing problems of fault-tolerant clocking, the three CPUs each have their own separate and independent clocks, but are loosely synchronized, as by detecting events such as memory references and stalling any CPU ahead of others until all execute the function simultaneously; the interrupts are also synchronized to the CPUs ensuring that the CPUs execute the interrupt at the same point in their instruction stream. The three asynchronous memory references via the separate CPU-to-memory busses are voted at the three separate ports of each of the memory modules at the time of the memory request, but read data is not voted when returned to the CPUs.

The two memories both perform all write requests received from either the CPUs or the I/O busses, so that both are kept up-to-date, but only one memory module presents read data back to the CPUs in response to read requests; the one memory module producing read data is designated the "primary" and the other is the backup. Both memories present read data back to the I/O processors (IOP's) in response to I/O requests. The memory requests to the two memory modules are implemented while the voting is still going on, so the read data is available to the CPUs a short delay after the last one of the CPUs makes the request. Even write cycles can be substantially overlapped because DRAMs used for these memory modules use a large part of the write access to merely read and refresh, then if not strobed for the last part of the write cycle the read is non-destructive, therefore, a write cycle begins as soon as the first CPU makes a request, but does not complete until the last request has been received and voted good. These features of non-voted read-data returns and overlapped accesses allow fault-tolerant operation at high performance, but yet at minimum complexity and expense.

I/O functions are implemented using two identical I/O busses, each of which is separately coupled to only one of the memory modules. A number of I/O processors are coupled to both I/O busses, and I/O devices are coupled to pairs of the I/O processors but accessed by only one of the I/O processors at a time. The CPUs can access the I/O processors through the memory modules (each access being voted just as the memory accesses are voted), but the I/O processors can only access the memory modules, not the CPUs; the I/O processors can only send interrupts to the CPUs, and these interrupts are collected in the memory modules before being presented to the CPUs. If an I/O processor fails, the other one of the pair can take over control of the I/O devices for this I/O processor via system software by manipulating certain control registers resident on the CPU, memory modules, and remaining I/O processor and by altering operating system data structures. In this manner, fault tolerance and reintegration of an I/O device is possible without system shutdown.

The memory system used in the preferred embodiments is hierarchical at several levels. Each CPU has its own cache, operating at essentially the clock speed of the CPU. Then each CPU has a local memory not accessible by the other CPUs, and virtual memory management allows but does not require the kernel of the operating system and pages for the current task to be in local memory for all three CPUs, accessible at high speed without overhead of voting imposed. Next is the memory module level, referred to as global memory, where voting and synchronization take place so some access-time burden is introduced; nevertheless, the speed of the global memory is much faster than disk access, so this level is used for page swapping with local memory to keep the most-used data in the fastest area, rather than employing disk for the first level of demand paging. Global memory is also used as a staging area for DMA accesses from I/O controllers.

One of the features of the disclosed embodiment of the invention is the ability to replace faulty redundant units or FRU's (CPUs, Memory Modules, IOPs, Battery Modules, I/O Controllers, etc.) without shutting down the system. Thus, the system is available for continuous use even though components may fail and have to be replaced. In addition, the ability to obtain a high level of fault tolerance with fewer system components, e.g., no fault-tolerant clocking needed, only two memory modules needed instead of three, voting circuits minimized, etc., means that there are fewer components to fail, and so the reliability is enhanced. That is, there are fewer failures because there are fewer components, and when there are failures to components are isolated to allow the system to keep running, while the components can be replaced without system shut-down.

The system in a preferred embodiment provides a high degree of fault tolerance and data integrity for applications that require very high system availability. Fault tolerance is achieved through a combination of redundant processors and memory along with dual I/O and mass storage systems (including mirrored disk volumes, for example), and redundant uninterruptable power supplies with redundant battery backup. Failure detection and methods for disabling and reintegrating modules permit continued operation without compromising data integrity during the presence of hardware faults.

Before a replacement module is reintegrated, the condition of the replacement may be verified by running a power-on self-test on that module and then performing module-dependent synchronization activites including: (1) for CPUs, the current state of the two good CPU modules is saved and all three modules are synchronized to begin executing the same instruction stream out of global memory, this instruction stream being a copy routine that reads the local memory contents of the two good CPUs to global memory and then writes the local memory data back to all three CPUs; (2) for memory modules, a replacement module is reintegrated by copying the contents of the good memory to local memory on the CPUs and recopying those contents back to both memory modules, this function being performed in block transfers and time shared with normal system processing, while any CPU or I/O processor writes that occur during the reintegrated are also performed on both memory modules; (3) an I/O processor is reintegrated by initializing the I/O processor registers and interfaces on the new I/O processor, then reassigning I/O controllers to the replacement I/O processor; (4) reintegration of replacement I/O controllers involves powering up, assignment to an I/O processor, and reinitializing host and controller data structures; (5) reintegration of I/O devices involves device-specific activities performed by the operating system device drivers assigned to the I/O controller to which the device is attached (and possibly user level software).

The system can continue to function in the presence of multiple hardware faults as long as the following minimum configuration is maintained: (1) two of three CPUs; (2) one of two memory modules; (3) one of the I/O processors; (4) one of its disk subsystems; and (5) the appropriate power subsystem modules to support the above configuration.

A fault monitoring and detection system may be used for detecting corrupted data and automatically inhibiting permanent storage of corrupted data. A variety of fault detection mechanisms are used in the system including: (1) replicated operations (in CPU and memory areas) are voted to reduce number of checking circuits needed to ensure high data integrity; (2) error detecting codes may be used for data storage and transfer (includes parity, checksums on blocks of data, etc.); (3) checks on timing of communications between hardware modules (requests for service are monitored and timed and status reported); (4) self checking circuits are used; (5) soft errors are monitored and reported.

BRIEF DESCRIPTION OF THE DRAWINGS

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

FIG. 9 is a physical memory map of the memories used in the system of FIGS. 1, 2, 3 and 4;

FIG. 10 is a virtual memory map of the CPUs used in the system of FIGS. 1, 2, 3 and 4;

DETAILED DESCRIPTION OF SPECIFIC EMBODIMENT

Figure 1:
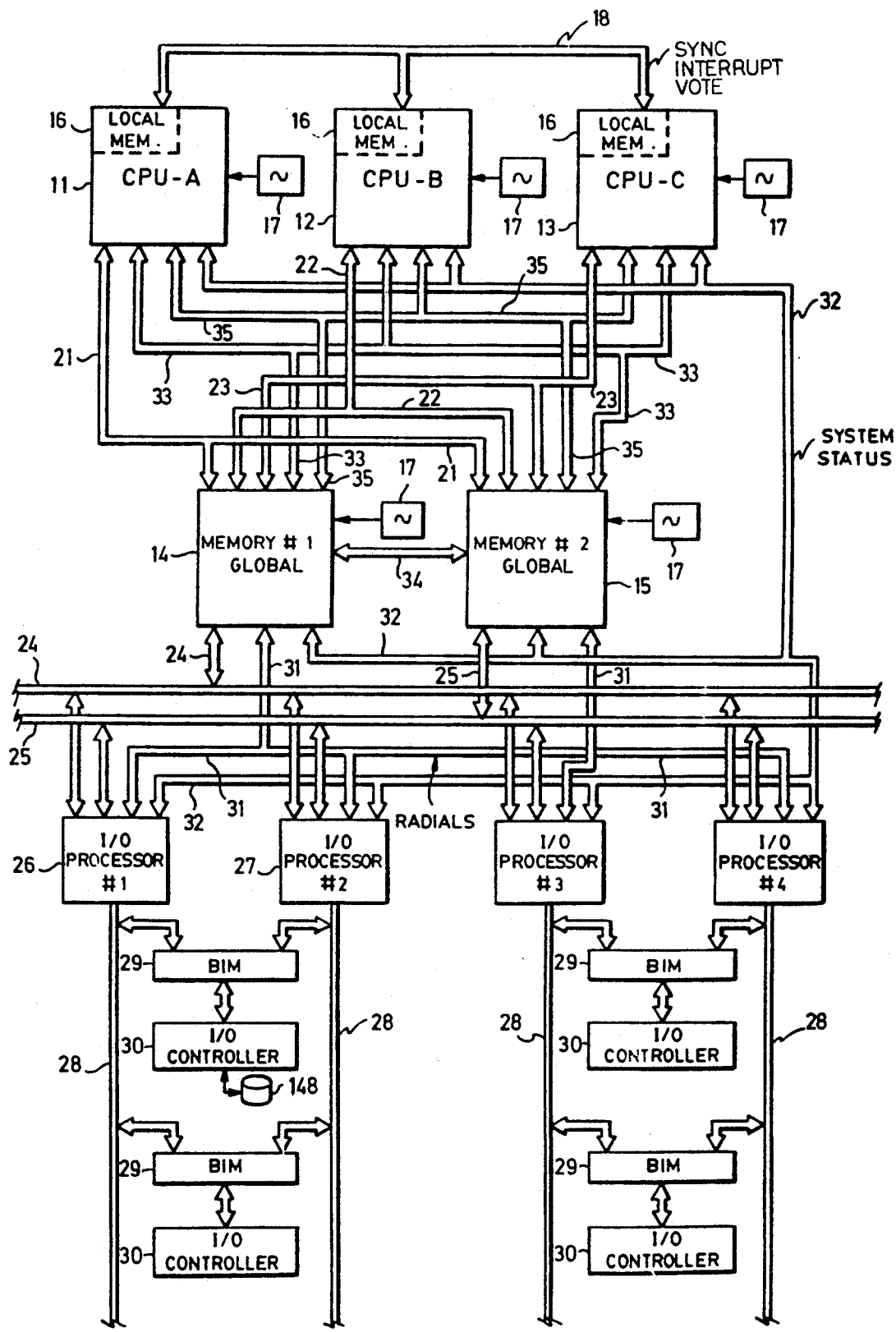
FIG. 1 is an electrical diagram in block form of a computer system according to one embodiment of the invention.

With reference to FIG. 1, a computer system using features of the invention is shown in one embodiment having three identical processors 11, 12 and 13, referred to as CPU-A, CPU-B and CPU-C, which operate as one logical processor, all three typically executing the same instruction stream; the only time the three processors are not executing the same instruction stream is in such operations as power-up self test, diagnostics and the like. The three processors are coupled to two memory modules 14 and 15, referred to as Memory-#1 and Memory-#2, each memory storing the same data in the same logical address space. In a preferred embodiment, each one of the processors 11, 12 and 13 contains its own local memory 16, as well, accessible only by the processor containing this memory.

Each one of the processors 11, 12 and 13, as well as each one of the memory modules 14 and 15, has its own separate clock oscillator 17; in this embodiment, the processors are not run in "lock step", but instead are loosely synchronized by a method such as is set forth in the above-mentioned application Ser. No. 118,503, i.e., using events such as external memory references to bring the CPUs into synchronization. External interrupts are synchronized among the three CPUs by a technique employing a set of busses 18 for coupling the interrupt requests and status from each of the processors to the other two; each one of the processors CPU-A, CPU-B and CPU-C is responsive to the three interrupt requests, its own and the two received from the other CPUs, to present an interrupt to the CPUs at the same point in the execution stream. The memory modules 14 and 15 vote the memory references, and allow a memory reference to proceed only when all three CPUs have made the same request (with provision for faults). In this manner, the processors are synchronized at the time of external events (memory references), resulting in the processors typically executing the same instruction stream, in the same sequence, but not necessarily during aligned clock cycles in the time between synchronization events. In addition, external interrupts are synchronized to be executed at the same point in the instruction stream of each CPU.

The CPU-A processor 11 is connected to the Memory-#1 module 14 and to the Memory-#2 module 15 by a bus 21; likewise the CPU-B is connected to the modules 14 and 15 by a bus 22, and the CPU-C is connected to the memory modules by a bus 23. These busses 21, 22, 23 each include a 32-bit multiplexed address/data bus, a command bus, and control lines for address and data strobes. The CPUs have control of these busses 21, 22 and 23, so there is no arbitration, or bus-request and bus-grant.

Each one of the memory modules 14 and 15 is separately coupled to a respective input/output bus 24 or 25, and each of these busses is coupled to two (or more) input/output processors 26 and 27. The system can have multiple I/O processors as needed to accommodate the I/O devices needed for the particular system configuration. Each one of the input/output processors 26 and 27 is connected to a bus 28, and each bus 28 is connected to one or more bus interface modules 29 for interface with a standard I/O controller 30 which may be of the VMEbus ™ type. Each bus interface module 29 is connected to two of the busses 28, so failure of one I/O processor 26 or 27, or failure of one of the bus channels 28, can be tolerated. The I/O processors 26 and 27 can be addressed by the CPUs 11, 12 and 13 through the memory modules 14 and 15, and can signal an interrupt to the CPUs via the memory modules. Disk drives, terminals with CRT screens and keyboards, and network adapters, are typical peripheral devices operated by the controllers 30. The controllers 30 may make DMA-type references to the memory modules 14 and 15 to transfer blocks of data. Each one of the I/O processors 26, 27, etc., has certain individual lines directly connected to each one of the memory modules for bus request, bus grant, etc.; these point-to-point connections are called "radials" and are included in a group of radial lines 31.

A system status bus 32 is individually connected to each one of the CPUs 11, 12 and 13, to each memory module 14 and 15, and to each of the I/O processors 26 and 27, for the purpose of providing information on the status of each element. This status bus provides information about which of the CPUs, memory modules and I/O processors is currently in the system and operating properly.

An acknowledge/status bus 33 connecting the three CPUs and two memory modules includes individual lines by which the modules 14 and 15 send acknowledge signals to the CPUs when memory requests are made by the CPUs, and at the same time a status field is sent to report on the status of the command and whether it executed correctly. The memory modules not only check parity on data read from or written to the global memory, but also check parity on data passing through the memory modules to or from the I/O busses 24 and 25, as well as checking the validity of commands. It is through the status lines in bus 33 that these checks are reported to the CPUs 11, 12 and 13, so if errors occur a fault routine can be entered to isolate a faulty component.

Even though both memory modules 14 and 15 are storing the same data in global memory, and operating to perform every memory reference in duplicate, one of these memory modules is designated as primary and the other as back-up, at any given time. Memory write operations are executed by both memory modules so both are kept current, and also a memory read operation is executed by both, but only the primary module actually loads the read-data back onto the busses 21, 22 and 23, and only the primary memory module controls the arbitration for multi-master busses 24 and 25. To keep the primary and back-up modules executing the same operations, a bus 34 conveys control information from primary to back-up. Either module can assume the role of primary at boot-up, and the roles can switch during operation under software control; the roles can also switch when selected error conditions are detected by the CPUs or other error-responsive parts of the system.

Certain interrupts generated in the CPUs are also voted by the memory modules 14 and 15. When the CPUs encounter such an interrupt condition (and are not stalled), they signal an interrupt request to the memory modules by individual lines in an interrupt bus 35, so the three interrupt requests from the three CPUs can be voted. When all interrupts have been voted, the memory modules each send a voted-interrupt signal to the three CPUs via bus 35. This voting of interrupts also functions to check on the operation of the CPUs. The three CPUs synch the voted interrupt CPU interrupt signal via the inter-CPU bus 18 and present the interrupt to the processors at a common point in the instruction stream. This interrupt synchronization is accomplished without stalling any of the CPUs.

Figure 2:
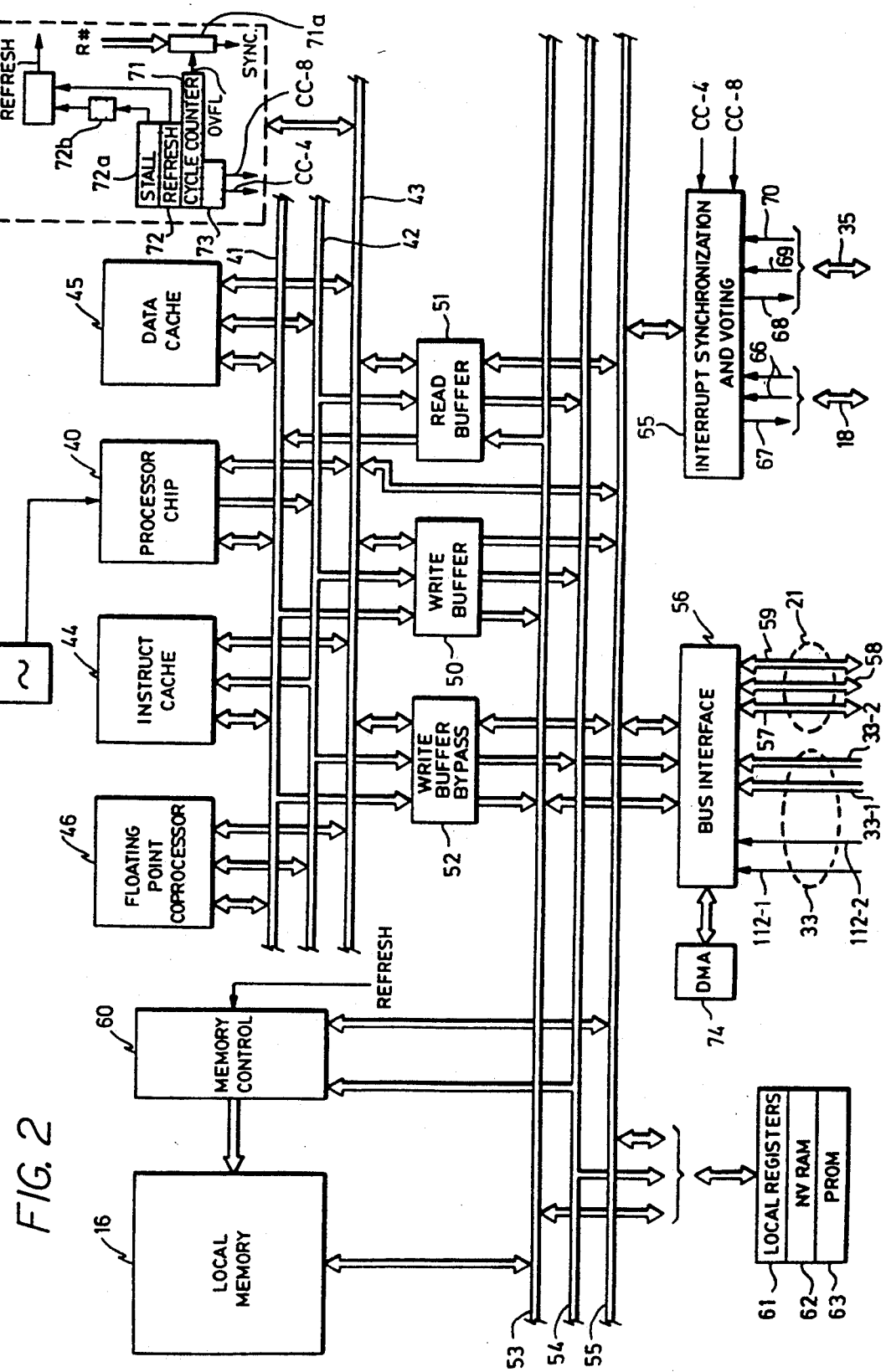
FIG. 2 is an electrical schematic diagram in block form of one of the CPUs of the system of FIG. 1.

CPU Module:

Referring now to FIG. 2, one of the processors 11, 12 or 13 is shown in more detail. All three CPU modules are of the same construction in a preferred embodiment, so only CPU-A will be described here. In order to keep costs within a competitive range, and to provide ready access to already-developed software and operating systems, it is preferred to use a commercially-available microprocessor chip, and any one of a number of devices may be chosen. The RISC (reduced instruction set) architecture has some advantage in implementing the loose synchronization as will be described, but more-conventional CISC (complex instruction set) microprocessors such as Motorola 68030 devices or Intel 80386 devices (available in 20-Mhz and 25-Mhz speeds) could be used. High-speed 32-bit RISC microprocessor devices are available from several sources in three basic types; Motorola produces a device as part number 88000, MIPS Computer Systems, Inc. and others produce a chip set referred to as the MIPS type, and Sun Microsystems has announced a so-called SPARC ™ type (scalable processor architecture). Cypress Semiconductor of San Jose, Calif., for example, manufactures a microprocessor referred to as part number CY7C601 providing 20-MIPS (million instructions per second), clocked at 33-MHz, supporting the SPARC standard, and Fujitsu manufactures a CMOS RISC microprocessor, part number S-25, also supporting the SPARC standard.

The CPU board or module in the illustrative embodiment, used as an example, employs a microprocessor chip 40 which is in this case an R2000 device designed by MIPS Computer Systems, Inc., and also manufactured by Integrated Device Technology, Inc. The R2000 device is a 32-bit processor using RISC architecture to provide high performance, e.g., 12-MIPS at 16.67-MHz clock rate. Higher-speed versions of this device may be used instead, such as the R3000 that provides 20-MIPS at 25-MHz clock rate. The processor 40 also has a co-processor used for memory management, including a translation lookaside buffer to cache translations of logical to physical addresses. The processor 40 is coupled to a local bus having a data bus 41, an address bus 42 and a control bus 43. Separate instruction and data cache memories 44 and 45 are coupled to this local bus. These caches are each of 64K-byte size, for example, and are accessed within a single clock cycle of the processor 40. A numeric or floating point co-processor 46 is coupled to the local bus if additional performance is needed for these types of calculations; this numeric processor device is also commercially available from MIPS Computer Systems as part number R2010. The local bus 41, 42, 43, is coupled to an internal bus structure through a write buffer 50 and a read buffer 51. The write buffer is a commercially available device, part number R2020, and functions to allow the processor 40 to continue to execute Run cycles after storing data and address in the write buffer 50 for a write operation, rather than having to execute stall cycles while the write is completing.

In addition to the path through the write buffer 50, a path is provided to allow the processor 40 to execute write operations bypassing the write buffer 50. This path is a write buffer bypass 52 allows the processor, under software selection, to perform synchronous writes. If the write buffer bypass 52 is enabled (write buffer 50 not enabled) and the processor executes a write then the processor will stall until the write completes. In contrast, when writes are executed with the write buffer bypass 52 disabled the processor will not stall because data is written into the write buffer 50 (unless the write buffer is full). If the write buffer 50 is enabled when the processor 40 performs a write operation, the write buffer 50 captures the output data from bus 41 and the address from bus 42, as well as controls from bus 43. The write buffer 50 can hold up to four such data-address sets while it waits to pass the data on to the main memory. The write buffer runs synchronously with the clock 17 of the processor chip 40, so the processor-to-buffer transfers are synchronous and at the machine cycle rate of the processor. The write buffer 50 signals the processor if it is full and unable to accept data. Read operations by the processor 40 are checked against the addresses contained in the four-deep write buffer 50, so if a read is attempted to one of the data words waiting in the write buffer to be written to memory 16 or to global memory, the read is stalled until the write is completed.

The write and read buffers 50 and 51 are coupled to an internal bus structure having a data bus 53, an address bus 54 and a control bus 55. The local memory 16 is accessed by this internal bus, and a bus interface 56 coupled to the internal bus is used to access the system bus 21 (or bus 22 or 23 for the other CPUs). The separate data and address busses 53 and 54 of the internal bus (as derived from busses 41 and 42 of the local bus) are converted to a multiplexed address/data bus 57 in the system bus 21, and the command and control lines are correspondingly converted to command lines 58 and control lines 59 in this external bus.

The bus interface unit 56 also receives the acknowledge/status lines 33 from the memory modules 14 and 15. In these lines 33, separate status lines 33-1 or 33-2 are coupled from each of the modules 14 and 15, so the responses from both memory modules can be evaluated upon the event of a transfer (read or write) between CPUs and global memory, as will be explained.

The local memory 16, in one embodiment, comprises about 8-Mbyte of RAM which can be accessed in about three or four of the machine cycles of processor 40, and this access is synchronous with the clock 17 of this CPU, whereas the memory access time to the modules 14 and 15 is much greater than that to local memory, and this access to the memory modules 14 and 15 is asynchronous and subject to the synchronization overhead imposed by waiting for all CPUs to make the request then voting. For comparison, access to a typical commercially-available disk memory through the I/O processors 26, 27 and 29 is measured in milliseconds, i.e., considerably slower than access to the modules 14 and 15. Thus, there is a hierarchy of memory access by the CPU chip 40, the highest being the instruction and data caches 44 and 45 which will provide a hit ratio of perhaps 95% when using 64-KByte cache size and suitable fill algorithms. The second highest is the local memory 16, and again by employing contemporary virtual memory management algorithms a hit ratio of perhaps 95% is obtained for memory references for which a cache miss occurs but a hit in local memory 16 is found, in an example where the size of the local memory is about 8-MByte. The net result, from the standpoint of the processor chip 40, is that perhaps greater than 99% of memory references (but not I/O references) will be synchronous and will occur in either the same machine cycle or in three or four machine cycles.

The local memory 16 is accessed from the internal bus by a memory controller 60 which receives the addresses from address bus 54, and the address strobes from the control bus 55, and generates separate row and column addresses, and RAS and CAS controls, for example, if the local memory 16 employs DRAMs with multiplexed addressing, as is usually the case. Data is written to or read from the local memory via data bus 53. In addition, several local registers 61, as well as non-volatile memory 62 such as NVRAMs, and high-speed PROMs 63, as may be used by the operating system, are accessed by the internal bus; some of this part of the memory is used only at power-on, some is used by the operating system and may be almost continuously within the cache 44, and other may be within the non-cached part of the memory map.

External interrupts are applied to the processor 40 by one of the pins of the control bus 43 or 55 from an interrupt circuit 65 in the CPU module of FIG. 2. This type of interrupt is voted in the circuit 65, so that before an interrupt is executed by the processor 40 it is determined whether or not all three CPUs are presented with the interrupt; to this end, the circuit 65 receives interrupt pending inputs 66 from the other two CPUs 12 and 13, and sends an interrupt pending signal to the other two CPUs via line 67, these lines being part of the bus 18 connecting the three CPUs 11, 12 and 13 together. Also, for voting other types of interrupts, specifically CPU-generated interrupts, the circuit 65 can send an interrupt request from this CPU to both of the memory modules 14 and 15 by a line 68 in the bus 35, then receive separate voted-interrupt signals from the memory modules via lines 69 and 70; both memory modules will present the external interrupt to be acted upon. An interrupt generated in some external source such as a keyboard or disk drive on one of the I/O channels 28, for example, will not be presented to the interrupt pin of the chip 40 from the circuit 65 until each one of the CPUs 11, 12 and 13 is at the same point in the instruction stream, as will be explained.

Since the processors 40 are clocked by separate clock oscillators 17, there must be some mechanism for periodically bringing the processors 40 back into synchronization. Even though the clock oscillators 17 are of the same nominal frequency, e.g., 16.67-MHz, and the tolerance for these devices is about 25-ppm (parts per million), the processors can potentially become many cycles out of phase unless periodically brought back into synch. Of course, every time an external interrupt occurs the CPUs will be brought into synch in the sense of being interrupted at the same point in their instruction stream (due to the interrupt synch mechanism), but this does not help bring the cycle count into synch. The mechanism of voting memory references in the memory modules 14 and 15 will bring the CPUs into synch (in real time), as will be explained. However, some conditions result in long periods where no memory reference occurs, and so an additional mechanism is used to introduce stall cycles to bring the processors 40 back into synch. A cycle counter 71 is coupled to the clock 17 and the control pins of the processor 40 via control bus 43 to count machine cycles which are Run cycles (but not Stall cycles). This counter 71 includes a count register having a maximum count value selected to represent the period during which the maximum allowable drift between CPUs would occur (taking into account the specified tolerance for the crystal oscillators); when this count register overflows action is initiated to stall the faster processors until the slower processor or processors catch up. This counter 71 is reset whenever a synchronization is done by a memory reference to the memory modules 14 and 15. Also, a refresh counter 72 is employed to perform refresh cycles on the local memory 16, as will be explained. In addition, a counter 73 counts machine cycle which are Run cycles but not Stall cycles, like the counter 71 does, but this counter 73 is not reset by a memory reference; the counter 73 is used for interrupt synchronization as explained below, and to this end produces the output signals CC-4 and CC-8 to the interrupt synchronization circuit 65.

The processor 40 has a RISC instruction set which does not support memory-to-memory instructions, but instead only memory-to-register or register-to-memory instructions (i.e., load or store). It is important to keep frequently-used data and the currently-executing code in local memory. Accordingly, a block-transfer operation is provided by a DMA state machine 74 coupled to the bus interface 56. The processor 40 writes a word to a register in the DMA circuit 74 to function as a command, and writes the starting address and length of the block to registers in this circuit 74. In one embodiment, the microprocessor stalls while the DMA circuit takes over and executes the block transfer, producing the necessary addresses, commands and strobes on the busses 53-55 and 21. The command executed by the processor 40 to initiate this block transfer can be a read from a register in the DMA circuit 74. Since memory management in the Unix operating system relies upon demand paging, these block transfers will most often be pages being moved between global and local memory and I/O traffic. A page is 4-KBytes. Of course, the busses 21, 22 and 23 support single-word read and write transfers between CPUs and global memory; the block transfers referred to are only possible between local and global memory.

Figure 3:
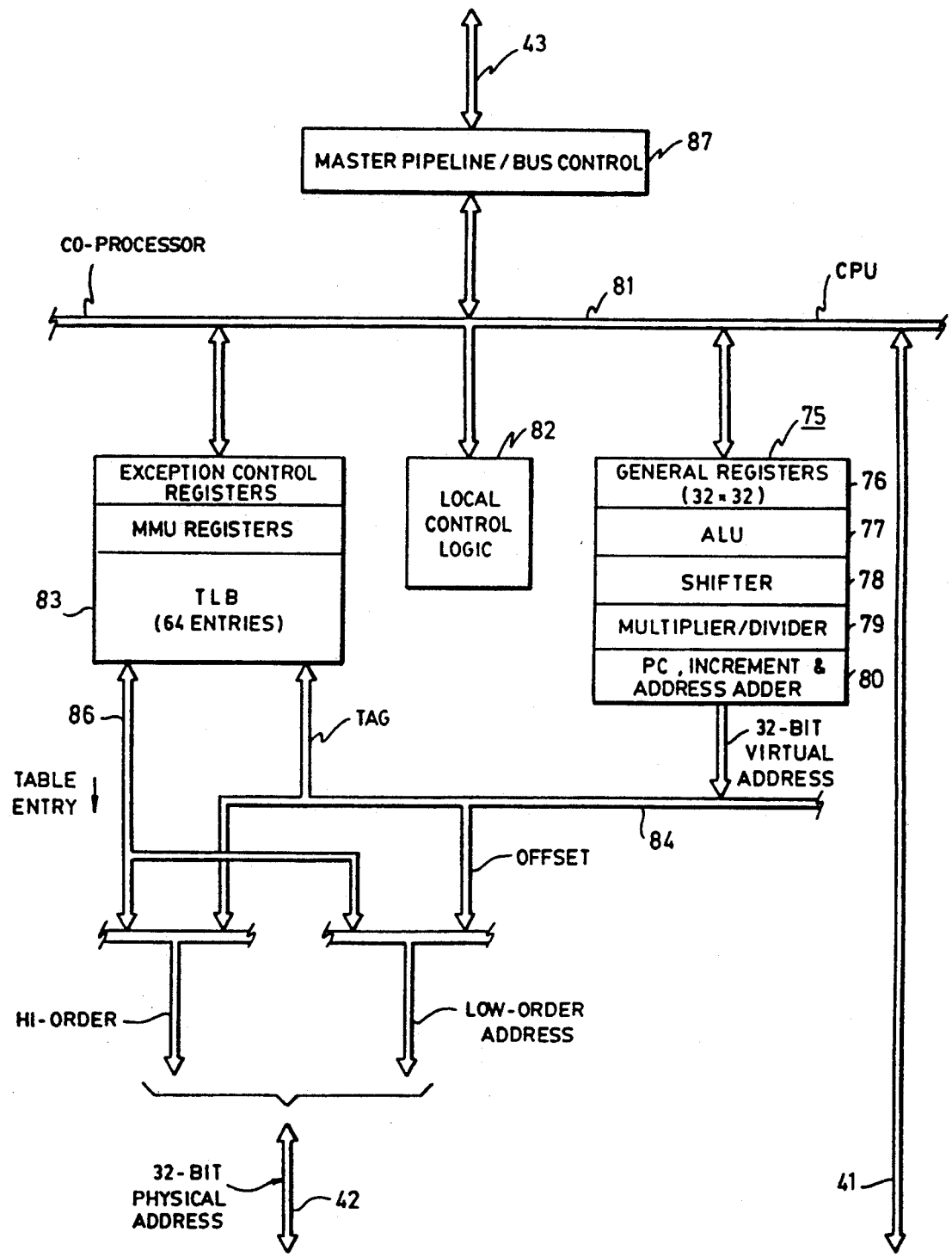
FIG. 3 is an electrical schematic diagram in block form of one of the microprocessor chips used in the CPU of FIG. 2.

The Processor:

Referring now to FIG. 3, the R2000 or R3000 type of microprocessor 40 of the example embodiment is shown in more detail. This device includes a main 32-bit CPU 75 containing thirty-two 32-bit general purpose registers 76, a 32-bit ALU 77, a zero-to-64 bit shifter 78, and a 32-by-32 multiply/divide circuit 79. This CPU also has a program counter 80 along with associated incrementer and adder. These components are coupled to a processor bus structure 81, which is coupled to the local data bus 41 and to an instruction decoder 82 with associated control logic to execute instructions fetched via data bus 41. The 32-bit local address bus 42 is driven by a virtual memory management arrangement including a translation lookaside buffer (TLB) 83 within an on-chip memory-management coprocessor. The TLB 83 contains sixty-four entries to be compared with a virtual address received from the microprocessor block 75 via virtual address bus 84. The low-order 16-bit part 85 of the bus 42 is driven by the low-order part of this virtual address bus 84, and the high-order part is from the bus 84 if the virtual address is used as the physical address, or is the tag entry from the TLB 83 via output 86 if virtual addressing is used and a hit occurs. The control lines 43 of the local bus are connected to pipeline and bus control circuitry 87, driven from the internal bus structure 81 and the control logic 82.

The microprocessor block 75 in the processor 40 is of the RISC type in that most instructions execute in one machine cycle, and the instruction set uses register-to-register and load/store instructions rather than having complex instructions involving memory references along with ALU operations. The main CPU 75 is highly pipelined to facilitate the goal of averaging one instruction execution per machine cycle. A single instruction is executed over a period including five machine cycles, where a machine cycle is one clock period or 60-nsec for a 16.67-MHz clock 17. Construction and operation of the R2000 processor is disclosed in Kane, "MIPS R2000 RISC Architecture", Prentice Hall, 1987.

Figure 4:
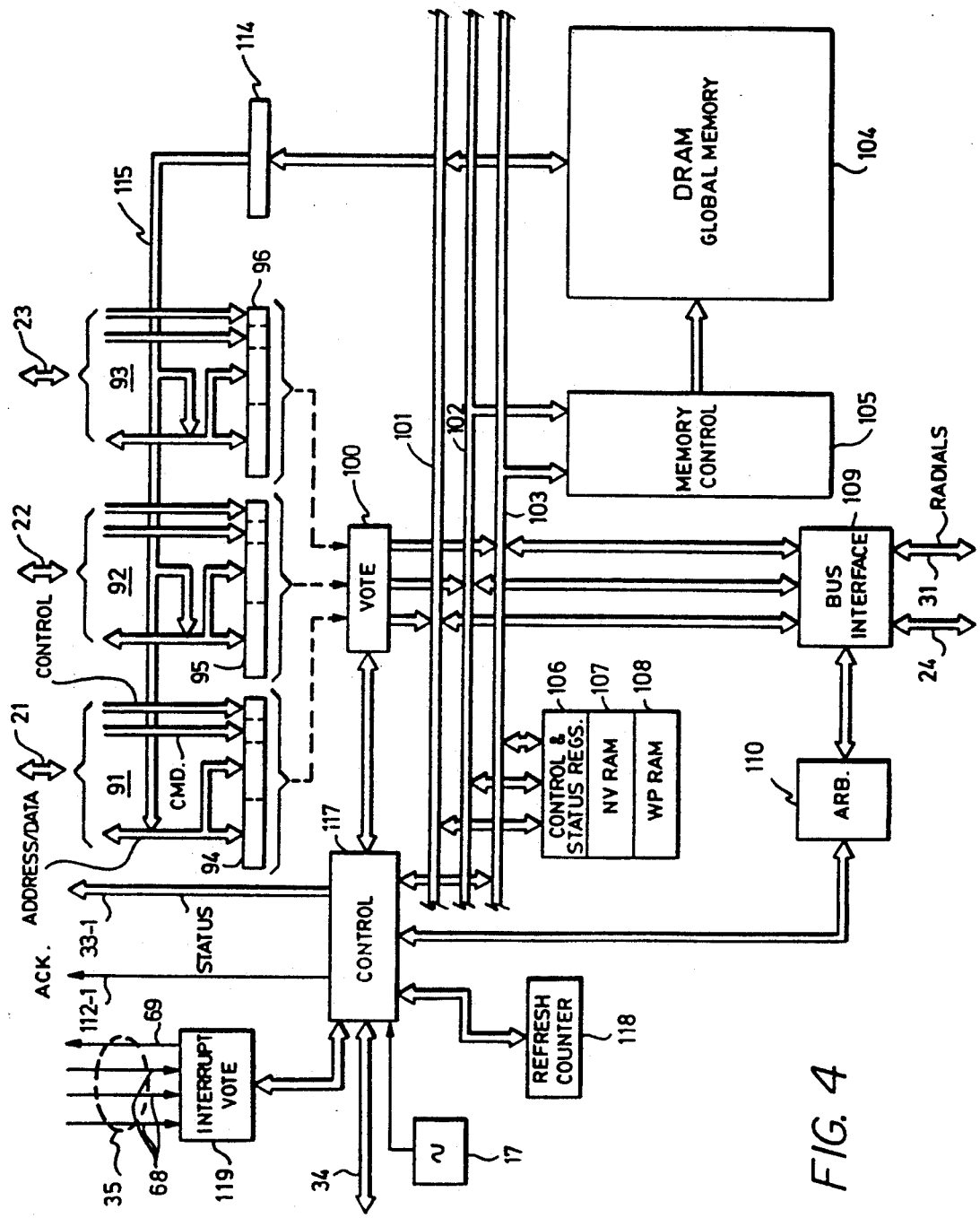
FIG. 4 is an electrical schematic diagram in block form of one of the memory modules in the computer system of FIG. 1.

Memory Module:

With reference to FIG. 4, one of the memory modules 14 or 15 is shown in detail. Both memory modules are of the same construction in a preferred embodiment, so only the Memory #1 module is shown. The memory module includes three input/output ports 91, 92 and 93 coupled to the three busses 21, 22 and 23 coming from the CPUs 11, 12 and 13, respectively. Inputs to these ports are latched into registers 94, 95 and 96 each of which has separate sections to store data, address, command and strobes for a write operation, or address, command and strobes for a read operation. The contents of these three registers are voted by a vote circuit 100 having inputs connected to all sections of all three registers. If all three of the CPUs 11, 12 and 13 make the same memory request (same address, same command), as should be the case since the CPUs are typically executing the same instruction stream, then the memory request is allowed to complete; however, as soon as the first memory request is latched into any one of the three latches 94, 95 or 96, it is passed on immediately to begin the memory access. To this end, the address, data and command are applied to an internal bus including data bus 101, address bus 102 and control bus 103. From this internal bus the memory request accesses various resources, depending upon the address, and depending upon the system configuration.

In one embodiment, a large DRAM 104 is accessed by the internal bus, using a memory controller 105 which accepts the address from address bus 102 and memory request and strobes from control bus 103 to generate multiplexed row and column addresses for the DRAM so that data input/output is provided on the data bus 101. This DRAM 104 is also referred to as global memory, and is of a size of perhaps 32-MByte in one embodiment. In addition, the internal bus 101-103 can access control and status registers 106, a quantity of non-volatile RAM 107, and write-protect RAM 108. The memory reference by the CPUs can also bypass the memory in the memory module 14 or 15 and access the I/O busses 24 and 25 by a bus interface 109 which has inputs connected to the internal bus 101-103. If the memory module is the primary memory module, a bus arbitrator 110 in each memory module controls the bus interface 109. If a memory module is the backup module, the bus 34 controls the bus interface 109.

A memory access to the DRAM 104 is initiated as soon as the first request is latched into one of the latches 94, 95 or 96, but is not allowed to complete unless the vote circuit 100 determines that a plurality of the requests are the same, with provision for faults. The arrival of the first of the three requests causes the access to the DRAM 104 to begin. For a read, the DRAM 104 is addressed, the sense amplifiers are strobed, and the data output is produced at the DRAM outputs, so if the vote is good after the third request is received then the requested data is ready for immediate transfer back to the CPUs. In this manner, voting is overlapped with DRAM access.

Figure 5:
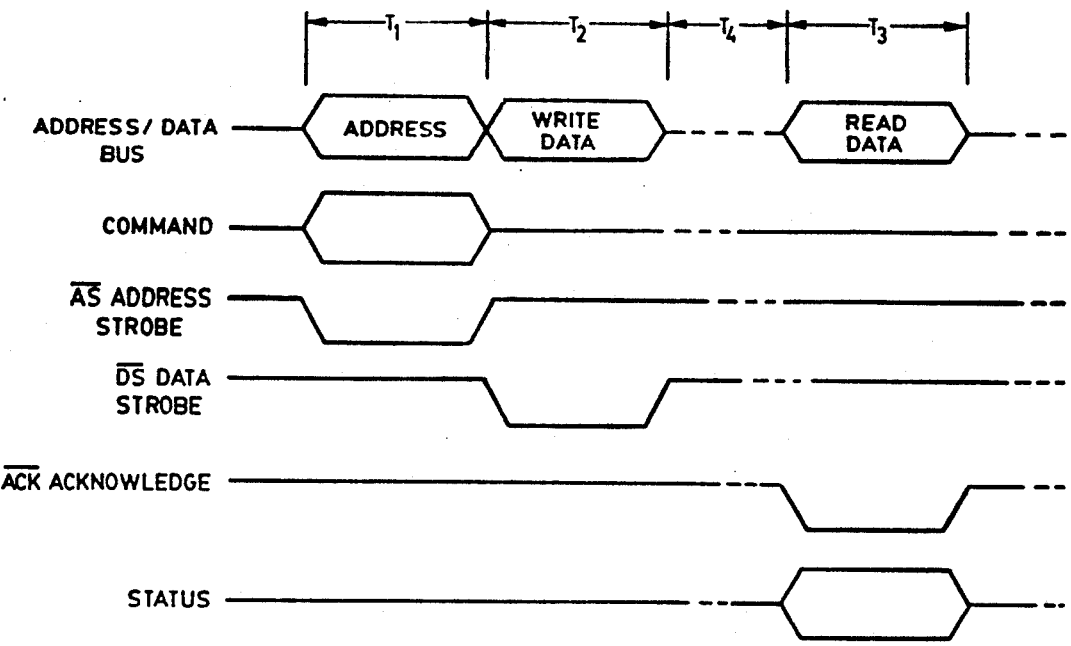
FIG. 5 is a timing diagram showing events occurring on the CPU to memory busses in the system of FIG. 1.

Referring to FIG. 5, the busses 21, 22 and 23 apply memory requests to ports 91, 92 and 93 of the memory modules 14 and 15 in the format illustrated. Each of these busses consists of thirty-two bidirectional multiplexed address/data lines, thirteen unidirectional command lines, and two strobes. The command lines include a field which specifies the type of bus activity, such as read, write, block transfer, single transfer, I/O read or write, etc. Also, a field functions as a byte enable for the four bytes. The strobes are AS, address strobe, and DS, data strobe. The CPUs 11, 12 and 13 each control their own bus 21, 22 or 23; in this embodiment, these are not multi-master busses; there is no contention or arbitration. For a write, the CPU drives the address and command onto the bus in one cycle along with the address strobe AS (active low), then in a subsequent cycle (possibly the next cycle, but not necessarily) drives the data onto the address/data lines of the bus at the same time as a data strobe DS. The address strobe AS from each CPU causes the address and command then appearing at the ports 91, 92 or 93 to be latched into the address and command sections of the registers 94, 95 and 96, as these strobes appear, then the data strobe DS causes the data to be latched. When a plurality (two out of three in this embodiment) of the busses 21, 22 and 23 drive the same memory request into the latches 94, 95 and 96, the vote circuit 100 passes on the final command to the bus 103 and the memory access will be executed; if the command in a write, an acknowledge ACK signal is sent back to each CPU by a line 112 (specifically line 112-1 for Memory#1 and line 112-2 for Memory#2) as soon as the write has been executed, and at the same time status bits are driven via acknowledge/status bus 33 (specifically lines 33-1 for Memory#1 and lines 33-2 for Memory#2) to each CPU at time T3 of FIG. 5. The delay T4 between the last strobe DS (or AS if a read) and the ACK at T3 is variable, depending upon how many cycles out of synch the CPUs are at the time of the memory request, and depending upon the delay in the voting circuit and the phase of the internal independent clock 17 of the memory module 14 or 15 compared to the CPU clocks 17. If the memory request issued by the CPUs is a read, then the ACK signal on lines 112-1 and 112-2 and the status bits on lines 33-1 and 33-2 will be sent at the same time as the data is driven to the address/data bus, during time T3; this will release the stall in the CPUs and thus synchronize the CPU chips 40 on the same instruction. That is, the fastest CPU will have executed more stall cycles as it waited for the slower ones to catch up, then all three will be released at the same time, although the clocks 17 will probably be out of phase; the first instruction executed by all three CPUs when they come out of stall will be the same instruction.

All data being sent from the memory module 14 or 15 to the CPUs 11, 12 and 13, whether the data is read data from the DRAM 104 or from the memory locations 106-108, or is I/O data from the busses 24 and 25, goes through a register 114. This register is loaded from the internal data bus 101, and an output 115 from this register is applied to the address/data lines for busses 21, 22 and 23 at ports 91, 92 and 93 at time T3. Parity is checked when the data is loaded to this register 114. All data written to the DRAM 104, and all data on the I/O busses, has parity bits associated with it, but the parity bits are not transferred on busses 21, 22 and 23 to the CPU modules. Parity errors detected at the read register 114 are reported to the CPU via the status busses 33-1 and 33-2. Only the memory module 14 or 15 designated as primary will drive the data in its register 114 onto the busses 21, 22 and 23. The memory module designated as back-up or secondary will complete a read operation all the way up to the point of loading the register 114 and checking parity, and will report status on buses 31-1 and 33-2, but no data will be driven to the busses 21, 22 and 23.

A controller 117 in each memory module 14 or 15 operates as a state machine clocked by the clock oscillator 17 for this module and receiving the various command lines from bus 103 and busses 21-23, etc., to generate control bits to load registers and busses, generate external control signals, and the like. This controller also is connected to the bus 34 between the memory modules 14 and 15 which transfers status and control information between the two. The controller 117 in the module 14 or 15 currently designated as primary will arbitrate via arbitrator 110 between the I/O side (interface 109) and the CPU side (ports 91-93) for access to the common bus 101-103. This decision made by the controller 117 in the primary memory module 14 or 15 is communicated to the controller 117 of other memory module by the lines 34, and forces the other memory module to execute the same access.

The controller 117 in each memory module also introduces refresh cycles for the DRAM 104, based upon a refresh counter 118 receiving pulses from the clock oscillator 17 for this module. The DRAM must receive 512 refresh cycles every 8-msec, so on average there must be a refresh cycle introduced about every 15-microsec. The counter 118 thus produces an overflow signal to the controller 117 every 15-microsec., and if an idle condition exists (no CPU access or I/O access executing) a refresh cycle is implemented by a command applied to the bus 103. If an operation is in progress, the refresh is executed when the current operation is finished. For lengthy operations such as block transfers used in memory paging, several refresh cycles may be backed up and execute in a burst mode after the transfer is completed; to this end, the number of overflows of counter 118 since the last refresh cycle are accumulated in a register associated with the counter 118.

Interrupt requests for CPU-generated interrupts are received from each CPU 11, 12 and 13 individually by lines 68 in the interrupt bus 35; these interrupt requests are sent to each memory module 14 and 15. These interrupt request lines 68 in bus 35 are applied to an interrupt vote circuit 119 which compares the three requests and produces a voted interrupt signal on outgoing line 69 of the bus 35. The CPUs each receive a voted interrupt signal on the two lines 69 and 70 (one from each module 14 and 15) via the bus 35. The voted interrupts from each memory module 14 and 15 are ORed and presented to the interrupt synchronizing circuit 65. The CPUs, under software control, decide which interrupts to service. External interrupts, generated in the I/O processors or I/O controllers, are also signalled to the CPUs through the memory modules 14 and 15 via lines 69 and 70 in bus 35, and likewise the CPUs only respond to an interrupt from the primary module 14 or 15.

Figure 6:
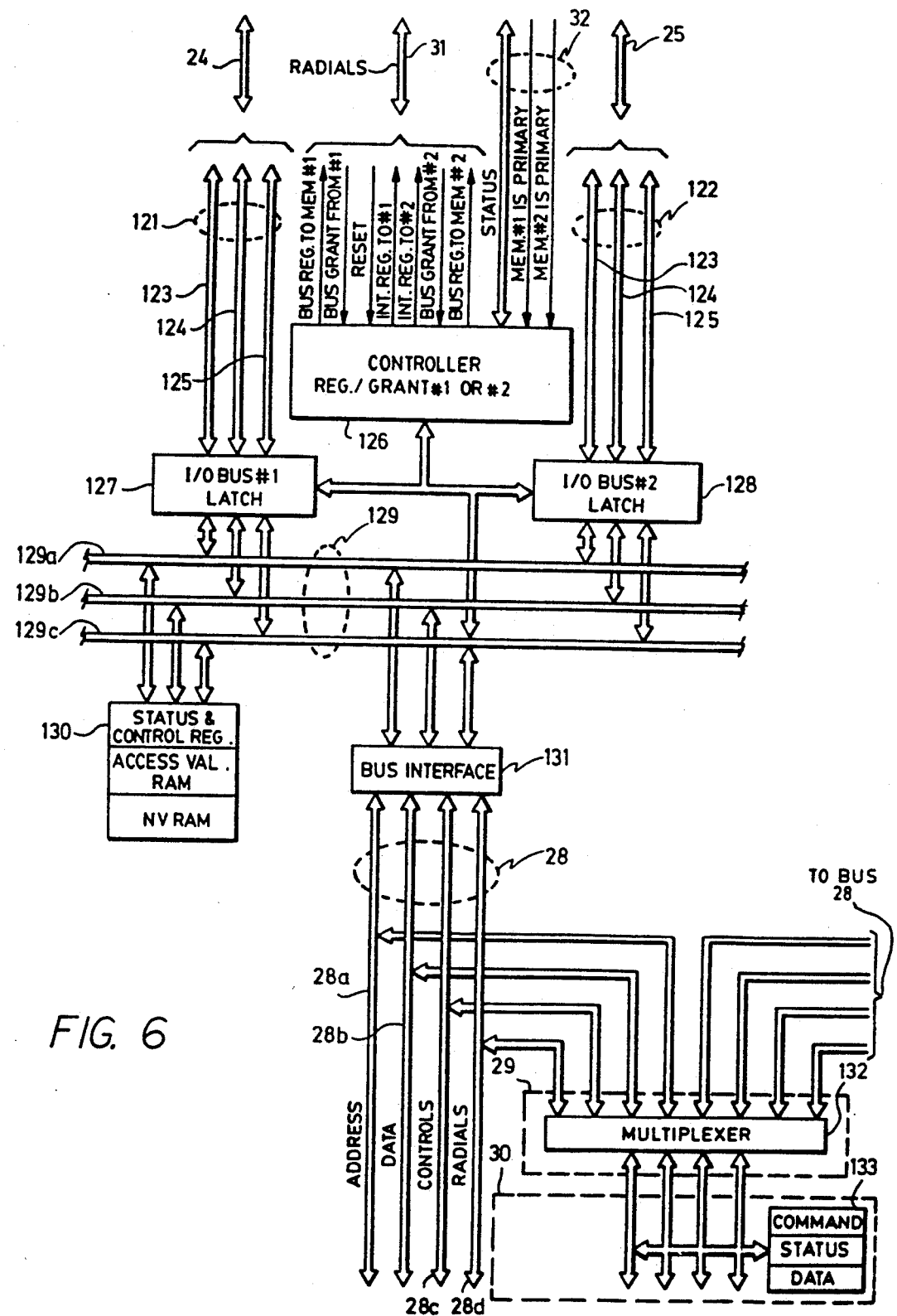
FIG. 6 is an electrical schematic diagram in block form of one of the I/O processors in the computer system of FIG. 1.

I/O Processor:

Referring now to FIG. 6, one of the I/O processors 26 or 27 is shown in detail. The I/O processor has two identical ports, one port 121 to the I/O bus 24 and the other port 122 to the I/O bus 25. Each one of the I/O busses 24 and 25 consists of: a 36-bit bidirectional multiplexed address/data bus 123 (containing 32-bits plus 4-bits parity), a bidirectional command bus 124 defining the read, write, block read, block write, etc., type of operation that is being executed, an address line that designates which location is being addressed, either internal to I/O processor or on busses 28, and the byte mask, and finally control lines 125 including address strobe, data strobe, address acknowledge and data acknowledge. The radial lines in bus 31 include individual lines from each I/O processor to each memory module: bus request from I/O processor to the memory modules, bus grant from the memory modules to the I/O processor, interrupt request lines from I/O processor to memory module, and a reset line from memory to I/O processor. Lines to indicate which memory module is primary are connected to each I/O processor via the system status bus 32. A controller or state machine 126 in the I/O processor of FIG. 6 receives the command, control, status and radial lines and internal data, and command lines from the busses 28, and defines the internal operation of the I/O processor, including operation of latches 127 and 128 which receive the contents of busses 24 and 25 and also hold information for transmitting onto the busses.

Transfer on the busses 24 and 25 from memory module to I/O processor uses a protocol as shown in FIG.

Figure 7:
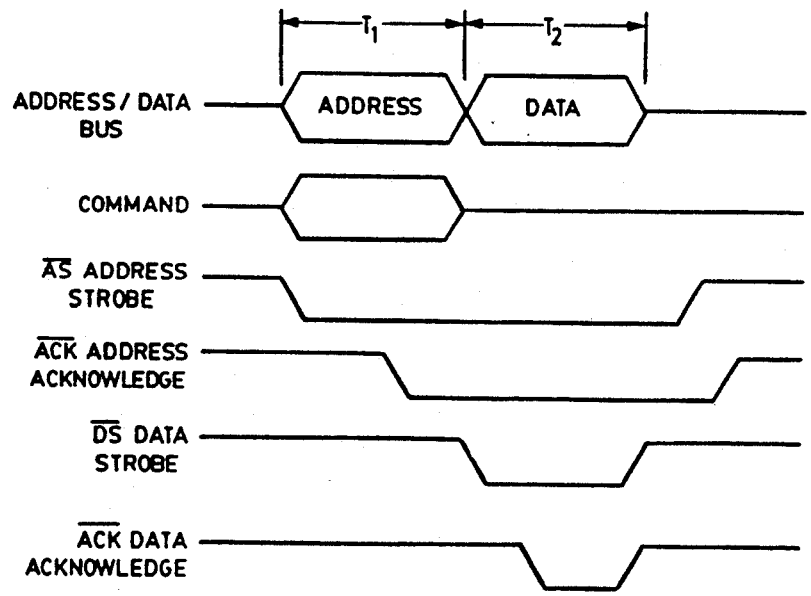
FIG. 7 is a timing diagram showing events vs. time for the transfer protocol between a memory module and an I/O processor in the system of FIG. 1.

7 with the address and data separately acknowledged. The arbitrator circuit 110 in the memory module which is designated primary performs the arbitration for ownership of the I/O busses 24 and 25. When a transfer from CPUs to I/O is needed, the CPU request is presented to the arbitration logic 110 in the memory module. When the arbiter 110 grants this request the memory modules apply the address and command to busses 123 and 124 (of both busses 24 and 25) at the same time the address strobe is asserted on bus 125 (of both busses 24 and 25) in time T1 of FIG. 7; when the controller 126 has caused the address to be latched into latches 127 or 128, the address acknowledge is asserted on bus 125, then the memory modules place the data (via both busses 24 and 25) on the bus 123 and a data strobe on lines 125 in time T2, following which the controller causes the data to be latched into both latches 127 and 128 and a data acknowledge signal is placed upon the lines 125, so upon receipt of the data acknowledge, both of the memory modules release the bus 24, 25 by de-asserting the address strobe signal. The I/O processor then deasserts the address acknowledge signal.

For transfers from I/O processor to the memory module, when the I/O processor needs to use the I/O bus, it asserts a bus request by a line in the radial bus 31, to both busses 24 and 25, then waits for a bus grant signal from an arbitrator circuit 110 in the primary memory module 14 or 15, the bus grant line also being one of the radials. When the bus grant has been asserted, the controller 126 then waits until the address strobe and address acknowledge signals on busses 125 are deasserted (i.e., false) meaning the previous transfer is completed. At that time, the controller 126 causes the address to be applied from latches 127 and 128 to lines 123 of both busses 24 and 25, the command to be applied to lines 124, and the address strobe to be applied to the bus 125 of both busses 24 and 25. When address acknowledge is received from both busses 24 and 25, these are followed by applying the data to the address/data busses, along with data strobes, and the transfer is completed with a data acknowledge signals from the memory modules to the I/O processor.

The latches 127 and 128 are coupled to an internal bus 129 including an address bus 129a, and data bus 129b and a control bus 129c, which can address internal status and control registers 130 used to set up the commands to be executed by the controller state machine 126, to hold the status distributed by the bus 32, etc. These registers 130 are addressable for read or write from the CPUs in the address space of the CPUs. A bus interface 131 communicates with the bus 28, under control of the controller 126. The bus 28 includes an address bus 28a, a data bus 28b, a control bus 28c, and radials 28d, and all of these lines are communicated through the bus interface modules 29 to the I/O controllers 30; the bus interface module 29 contains a multiplexer 132 to allow only one set of bus lines 28 (from one I/O processor or the other but not both) drive the controller 30. Internal to the controller 30 are command, control, status and data registers 133 which (as is standard practice for peripheral controllers of this type) are addressable from the CPUs 11, 12 and 13 for read and write to initiate and control operations in I/O devices.

Each one of the I/O controllers 30 has connections via a multiplexer 132 in the BIM 29 to both I/O processors 26 and 27 and can be controlled by either one, but is bound to one or the other by the program executing in the CPUs. In the event of a failure in one of the I/O processors, an I/O controller can be reassigned to the remaining I/O processor via the second port on BIM 29. A particular address (or set of addresses) is established for control and data-transfer registers 133 representing each controller 30, and these addresses are maintained in an I/O page table (normally in the kernel data section of local memory) by the operating system. These addresses associate each controller 30 as being accessible only through either I/O processor #1 or #2, but not both. That is, a different address is used to reach a particular register 133 via I/O processor 26 compared to I/O processor 27. The bus interface 131 (and controller 126) can switch the multiplexer 132 to accept bus 28 from one or the other, and this is done by a write to the registers 130 of the I/O processors from the CPUs. Thus, when the device driver is called up to access this controller 30, the operating system uses these addresses in the page table to do it. The processors 40 access the controllers 30 by I/O writes to the control and data-transfer registers 133 in these controllers using the write buffer bypass path 52, rather than through the write buffer 50, so these are synchronous writes, voted by circuits 100, passed through the memory modules to the busses 24 or 25, thus to the selected bus 28; the processors 40 stall until the write is completed. The I/O processor board of FIG. 6 is configured to detect certain failures, such as improper commands, time-outs where no response is received over bus 28, parity-checked data, etc., and when one of these failures is detected the I/O processor reports the error to the CPU via both memory modules 14 and 15 via busses 24 and 25. The CPU terminates the stall and continues processing. This is detected by the bus interface 56 as a bus fault, resulting in an interrup as will be explained, and self-correcting action if possible.

Synchronization:

The processors 40 used in the illustrative embodiment are of pipelined architecture with overlapped instruction execution, as discussed above. A synchronization technique used in this embodiment relies upon cycle counting, i.e., incrementing a counter 71 and a counter 73 of FIG. 2 every time an instruction is executed, generally as set forth in copending applications Ser. No. 282,538, Ser. No. 283,139, or Ser. No. 283,141, and application Ser. No. 118,503. Every time the pipeline advances an instruction is executed. One of the control lines in the control bus 43 is a signal RUN# which indicates that the pipeline is stalled; when RUN# is high the pipeline is stalled, when RUN# is low (logic zero) the pipeline advances each machine cycle. This RUN# signal is used in the numeric processor 46 to monitor the pipeline of the processor 40 so this coprocessor 46 can run in lockstep with its associated processor 40. This RUN# signal in the control bus 43 along with the clock 17 are used by the counters 71 and 73 to count Run cycles.

The size of the counter register 71, in a preferred embodiment, is chosen to be 4096, i.e., $2^{12}$, which is selected because the tolerances of the crystal oscillators used in the clocks 17 are such that the drift in about 4K Run cycles on average results in a skew or difference in number of cycles run by a processor chip 40 of about all that can be reasonably allowed for proper operation of the interrupt synchronization. One synchronization mechanism is to force action to cause the CPUs to synchronize whenever the counter 71 overflows. One such action is to force a cache miss in response to an overflow signal OVFL from the counter 71; this can be done by merely generating a false Miss signal (e.g., TagValid bit not set) on control bus 43 for the next I-cache reference, thus forcing a cache miss exception routine to be entered and the resultant memory reference will produce synchronization just as any memory reference does. Another method of forcing synchronization upon overflow of counter 71 is by forcing a stall in the processor 40, which can be done by using the overflow signal OVFL to generate a CP Busy (coprocessor busy) signal on control bus 43 via logic circuit 71a of FIG. 2; this CP Busy signal always results in the processor 40 entering stall until CP Busy is deasserted. All three processors will enter this stall because they are executing the same code and will count the same cycles in their counter 71, but the actual time they enter the stall will vary; the logic circuit 71a receives the RUN# signal from bus 43 of the other two processors via input R#, so when all three have stalled the CP Busy signal is released and the processors will come out of stall in synch again.

Thus, two synchronization techniques have been described, the first being the synchronization resulting from voting the memory references in circuits 100 in the memory modules, and the second by the overflow of counter 71 as just set forth. In addition, interrupts are synchronized, as will be described below. It is important to note, however, that the processors 40 are basically running free at their own clock speed, and are substantially decoupled from one another, except when synchronizing events occur. The fact that pipelined microprocessors are used would make lock-step synchronization with a single clock more difficult, and would degrade performance; also, use of the write buffer 50 serves to decouple the processors, and would be much less effective with close coupling of the processors. Likewise, the high-performance resulting from using instruction and data caches, and virtual memory management with the TLBs 83, would be more difficult to implement if close coupling were used, and performance would suffer.

Interrupt Synchronization:

The interrupt synchronization technique must distinguish between real time and so-called "virtual time". Real time is the external actual time, clock-on-the-wall time, measured in seconds, or for convenience, measured in machine cycles which are 60-nsec divisions in the example. The clock generators 17 each produce clock pulses in real time, of course. Virtual time is the internal cycle-count time of each of the processor chips 40 as measured in each one of the cycle counters 71 and 73, i.e., the instruction number of the instruction being executed by the processor chip, measured in instructions since some arbitrary beginning point.

The three CPUs of the system of FIGS. 1-3 are required to function as a single logical processor, thus requiring that the CPUs adhere to certain restrictions regarding their internal state to ensure that the programming model of the three CPUs is that of a single logical processor. Except in failure modes and in diagnostic functions, the instruction streams of the three CPUs are required to be identical. If not identical, then voting global memory accesses at voting circuitry 100 of FIG. 4 would be difficult; the voter would not know whether one CPU was faulty or whether it was executing a different sequence of instructions. The synchronization scheme is designed so that if the code stream of any CPU diverges from the code stream of the other CPUs, then a failure is assumed to have occurred. Interrupt synchronization provides one of the mechanisms of maintaining a single CPU image.

All interrupts are required to occur synchronous to virtual time, ensuring that the instruction streams of the three processors CPU-A, CPU-B and CPU-C will not diverge as a result of interrupts (there are other causes of divergent instruction streams, such as one processor reading different data than the data read by the other processors). Several scenarios exist whereby interrupts occurring asynchronous to virtual time would cause the code streams to diverge. For example, an interrupt causing a context switch on one CPU before process A completes, but causing the context switch after process A completes on another CPU would result in a situation where, at some point later, one CPU continues executing process A, but the other CPU cannot execute process A because that process had already completed. If in this case the interrupts occurred asynchronous to virtual time, then just the fact that the exception program counters were different could cause problems. The act of writing the exception program counters to global memory would result in the voter detecting different data from the three CPUs, producing a vote fault.

Certain types of exceptions in the CPUs are inherently synchronous to virtual time. One example is a breakpoint exception caused by the execution of a breakpoint instruction. Since the instruction streams of the CPUs are identical, the breakpoint exception occurs at the same point in virtual time on all three of the CPUs. Similarly, all such internal exceptions inherently occur synchronous to virtual time. For example, TLB exceptions are internal exceptions that are inherently synchronous. TLB exceptions occur because the virtual page number does not match any of the entries in the TLB 83. Because the act of translating addresses is solely a function of the instruction stream (exactly as in the case of the breakpoint exception), the translation is inherently synchronous to virtual time. In order to ensure that TLB exceptions are synchronous to virtual time, the state of the TLBs 83 must be identical in all three of the CPUs 11, 12 and 13, and this is guaranteed because the TLB 83 can only be modified by software. Again, since all of the CPUs execute the same instruction stream, the state of the TLBs 83 are always changed synchronous to virtual time. So, as a general rule of thumb, if an action is performed by software then the action is synchronous to virtual time. If an action is performed by hardware, which does not use the cycle counters 71, then the action is generally synchronous to real time.

External exceptions are not inherently synchronous to virtual time. I/O devices 26, 27 or 30 have no information about the virtual time of the three CPUs 11, 12 and 13. Therefore, all interrupts that are generated by these I/O devices must be synchronized to virtual time before presenting to the CPUs, as explained below. Floating point exceptions are different from I/O device interrupts because the floating point coprocessor 46 is tightly coupled to the microprocessor 40 within the CPU.

External devices view the three CPUs as one logical processor, and have no information about the synchronaity or lack of synchronaity between the CPUs, so the external devices cannot produce interrupts that are synchronous with the individual instruction stream (virtual time) of each CPU. Without any sort of synchronization, if some external device drove an interrupt at some instant of real time, and the interrupt was presented directly to the CPUs at this time then the three CPUs would take an exception trap at different instructions, resulting in an unacceptable state of the three CPUs. This is an example of an event (assertion of an interrupt) which is synchronous to real time but not synchronous to virtual time.

Figure 8:
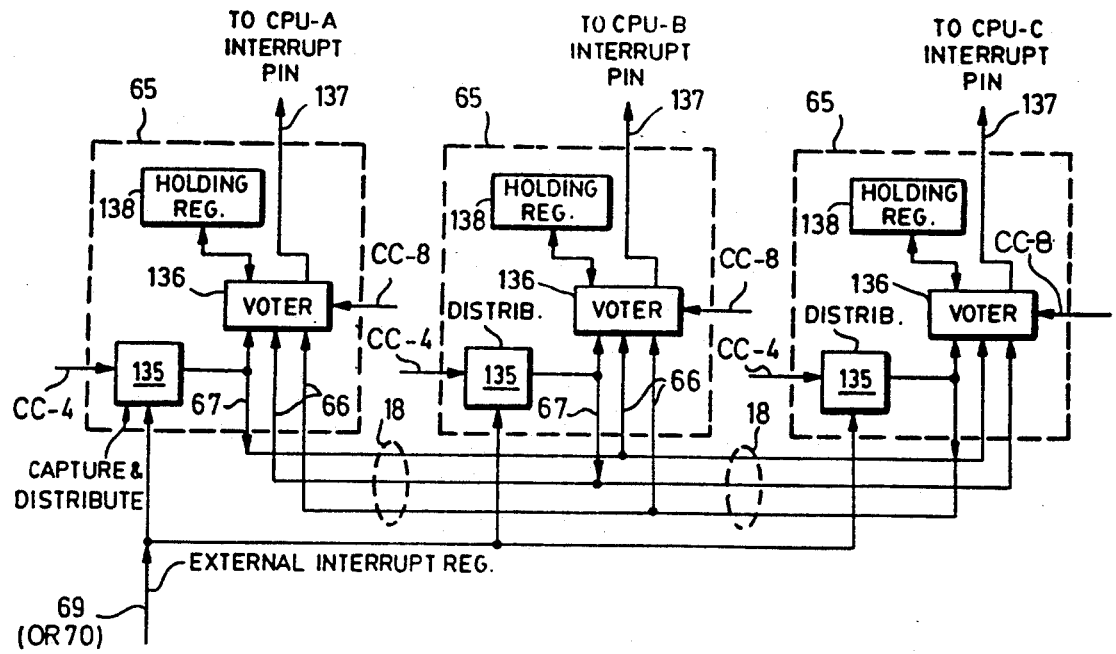
FIG. 8 is an electrical schematic diagram in block form of the interrupt synchronization circuit used in the CPU of FIG. 2.

Interrupts are synchronized to virtual time in the system of FIGS. 1-3 by performing a distributed vote on the interrupts and then presenting the interrupt to the processor on a predetermined cycle count. FIG. 8 shows a more detailed block diagram of the interrupt synchronization logic 65 of FIG. 2. Each CPU contains a distributor 135 which captures the external interrupt from the line 69 or 70 coming from the modules 14 or 15; this capture occurs on a predetermined cycle count, e.g., at count-4 as signalled on an input line CC-4 from the counter 71. The captured interrupt is distributed to the other two CPUs via the inter-CPU bus 18. These distributed interrupts are called pending interrupts. There are three pending interrupts, one from each CPU 11, 12 and 13. A voter circuit 136 captures the pending interrupts and performs a vote to verify that all of the CPUs did receive the external interrupt request. On a predetermined cycle count (detected from the cycle counter 71), in this example cycle-8 received by input line CC-8, the interrupt voter 136 presents the interrupt to the interrupt pin on its respective microprocessor 40 via line 137 and control bus 55 and 43. Since the cycle count that is used to present the interrupt is predetermined, all of the microprocessors 40 will receive the interrupt on the same cycle count and thus the interrupt will have been synchronized to virtual time.

Memory Management:

The CPUs 11, 12 and 13 of FIGS. 1-3 have memory space organized as illustrated in FIG. 9. Using the example that the local memory 16 is 8-MByte and the global memory 14 or 15 is 32-MByte, note that the local memory 16 is part of the same continuous zero-to-40M map of CPU memory access space, rather than being a cache or a separate memory space; realizing that the 0-8M section is triplicated (in the three CPU modules), and the 8-40M section is duplicated, nevertheless logically there is merely a single 0-40M physical address space. An address over 8-MByte on bus 54 causes the bus interface 56 to make a request to the memory modules 14 and 15, but an address under 8-MByte will access the local memory 16 within the CPU module itself. Performance is improved by placing more of the memory used by the applications being executed in local memory 16, and so as memory chips are available in higher densities at lower cost and higher speeds, additional local memory will be added, as well as additional global memory. For example, the local memory might be 32-MByte and the global memory 128-MByte. On the other hand, if a very minimum-cost system is needed, and performance is not a major determining factor, the system can be operated with no local memory, all main memory being in the global memory area (in memory modules 14 and 15), although the performance penalty is high for such a configuration.

The content of local memory portion 141 of the map of FIG. 9 is identical in the three CPUs 11, 12 and 13. Likewise, the two memory modules 14 and 15 contain identically the same data in their space 142 at any given instant. Within the local memory portion 141 is stored the kernel 143 (code) for the Unix operating system, and this area is physically mapped within a fixed portion of the local memory 16 of each CPU. Likewise, kernel data is assigned a fixed area 144 in each local memory 16; except upon boot-up, these blocks do not get swapped to or from global memory or disk. Another portion 145 of local memory 16 is employed for user program (and data) pages, which are swapped to area 146 of the global memory 14 and 15 under control of the operating system. The global memory area 142 is used as a staging area for user pages in area 146, and also as a disk buffer in an area 147; if the CPUs are executing code which performs a write of a block of data or code from local memory 16 to disk 148, then the sequence is to always write to a disk buffer area 147 instead. Then, while the CPUs proceed to execute other code, the write-to-disk operation is done, transparent to the CPUs, to move the block from area 147 to disk 148. In a like manner, the global memory area 146 is mapped to include an I/O staging 149 area, for similar treatment of I/O accesses other than disk (e.g., video).

The physical memory map of FIG. 9 is correlated with the virtual memory management system of the processor 40 in each CPU. FIG. 10 illustrates the virtual address map of the R2000 processor chip used in the example embodiment, although it is understood that other microprocessor chips supporting virtual memory management with paging and a protection mechanism would provide corresponding features.

In FIG. 10, two separate 2-GByte virtual address spaces 150 and 151 are illustrated; the processor 40 operates in one of two modes, user mode and kernel mode. The processor can only access the area 150 in the user mode, or can access both the areas 150 and 151 in the kernel mode. The kernel mode is analogous to the supervisory mode provided in many machines. The processor 40 is configured to operate normally in the user mode until an exception is detected forcing it into the kernel mode, where it remains until a restore from exception (RFE) instruction is executed. The manner in which the memory addresses are translated or mapped depends upon the operating mode of the microprocessor, which is defined by a bit in a status register. When in the user mode, a single, uniform virtual address space 150 referred to as "kuseg" of 2-GByte size is available. Each virtual address is also extended with a 6-bit process identifier (PID) field to form unique virtual addresses for up to sixty-four user processes. All references to this segment 150 in user mode are mapped through the TLB 83, and use of the caches 144 and 145 is determined by bit settings for each page entry in the TLB entries; i.e., some pages may be cachable and some not as specified by the programmer.

When in the kernel mode, the virtual address space includes both the areas 150 and 151 of FIG. 10, and this space has four separate segments kuseg 150, kseg0 152, kseg1 153 and kseg2 154. The kuseg 150 segment for the kernel mode is 2-GByte in size, coincident with the "kuseg" of the user mode, so when in the kernel mode the processor treats references to this segment just like user mode references, thus streamlining kernel access to user data. The kuseg 150 is used to hold user code and data, but the operating system often needs to reference this same code or data. The kseg0 area 152 is a 512-MByte kernel physical address space direct-mapped onto the first 512-MBytes of physical address space, and is cached but does not use the TLB 83; this segment is used for kernel executable code and some kernel data, and is represented by the area 143 of FIG. 9 in local memory 16. The kseg1 area 153 is also directly mapped into the first 512-MByte of physical address space, the same as kseg0, and is uncached and uses no TLB entries. Kseg1 differs from kseg0 only in that it is uncached. Kseg1 is used by the operating system for I/O registers, ROM code and disk buffers, and so corresponds to areas 147 and 149 of the physical map of FIG. 9. The kseg2 area 154 is a 1-GByte space which, like kuseg, uses TLB 83 entries to map virtual addresses to arbitrary physical ones, with or without caching. This kseg2 area differs from the kuseg area 150 only in that it is not accessible in the user mode, but instead only in the kernel mode. The operating system uses kseg2 for stacks and per-process data that must remap on context switches, for user page tables (memory map), and for some dynamically-allocated data areas. Kseg2 allows selective caching and mapping on a per page basis, rather than requiring an all-or-nothing approach.

Figure 11:
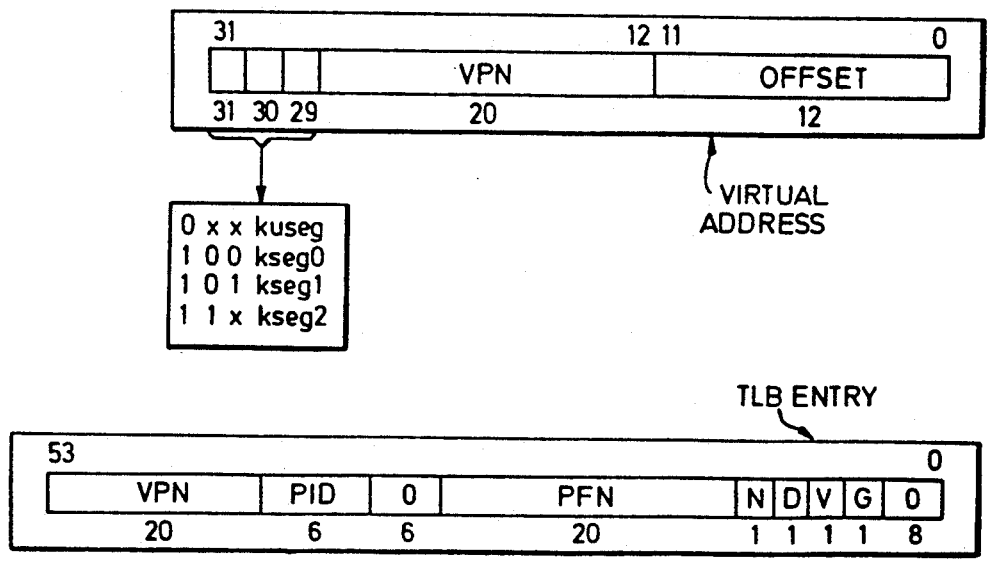
FIG. 11 is a diagram of the format of the virtual address and the TLB entries in the microprocessor chips in the CPU according to FIG. 2 or 3.

The 32-bit virtual addresses generated in the registers 76 or PC 80 of the microprocessor chip and output on the bus 84 are represented in FIG. 11, where it is seen that bits 0–11 are the offset used unconditionally as the low-order 12-bits of the address on bus 42 of FIG. 3, while bits 12–31 are the VPN or virtual page number in which bits 29–31 select between kuseg, kseg0, kseg1 and kseg2. The process identifier PID for the currently-executing process is stored in a register also accessible by the TLB. The 64-bit TLB entries are represented in FIG. 11 as well, where it is seen that the 20-bit VPN from the virtual address is compared to the 20-bit VPN field located in bits 44–63 of the 64-bit entry, while at the same time the PID is compared to bits 38–43; if a match is found in any of the sixty-four 64-bit TLB entries, the page frame number PFN at bits 12–31 of the matched entry is used as the output via busses 82 and 42 of FIG. 3 (assuming other criteria are met). Other one-bit values in a TLB entry include N, D, V and G. N is the non-cachable indicator, and if set the page is non-cachable and the processor directly accesses local memory or global memory instead of first accessing the cache 44 or 45. D is a write-protect bit, and if set means that the location is "dirty" and therefore writable, but if zero a write operation causes a trap. The V bit means valid if set, and allows the TLB entries to be cleared by merely resetting the valid bits; this V bit is used in the page-swapping arrangement of this system to indicate whether a page is in local or global memory. The G bit is to allow global accesses which ignore the PID match requirement for a valid TLB translation; in kseg2 this allows the kernel to access all mapped data without regard for PID.

The device controllers 30 cannot do DMA into local memory 16 directly, and so the global memory is used as a staging area for DMA type block transfers, typically from disk 148 or the like. The CPUs can perform operations directly at the controllers 30, to initiate or actually control operations by the controllers (i.e., programmed I/O), but the controllers 30 cannot do DMA except to global memory; the controllers 30 can become the bus (bus 28) master and through the I/O processor 26 or 27 do reads or writes directly to global memory in the memory modules 14 and 15.

Page swapping between global and local memories (and disk) is initiated either by a page fault or by an aging process. A page fault occurs when a process is executing and attempts to execute from or access a page that is in global memory or on disk; the TLB 83 will show a miss and a trap will result, so low level trap code in the kernel will show the location of the page, and a routine will be entered to initiate a page swap. If the page needed is in global memory, a series of commands are sent to the DMA controller 74 to write the least-recently-used page from local memory to global memory and to read the needed page from global to local. If the page is on disk, commands and addresses (sectors) are written to the controller 30 from the CPU to go to disk and acquire the page, then the process which made the memory reference is suspended. When the disk controller has found the data and is ready to send it, an interrupt is signalled which will be used by the memory modules (not reaching the CPUs) to allow the disk controller to begin a DMA to global memory to write the page into global memory, and when finished the CPU is interrupted to begin a block transfer under control of DMA controller 74 to swap a least used page from local to global and read the needed page to local. Then, the original process is made runnable again, state is restored, and the original memory reference will again occur, finding the needed page in local memory. The other mechanism to initiate page swapping is an aging routine by which the operating system periodically goes through the pages in local memory marking them as to whether or not each page has been used recently, and those that have not are subject to be pushed out to global memory. A task switch does not itself initiate page swapping, but instead as the new task begins to produce page faults, pages will be swapped as needed, and the candidates for swapping out are those not recently used.

If a memory reference is made and a TLB miss is shown, but the page table lookup resulting from the TLB miss exception shows the page is in local memory, then a TLB entry is made to show this page to be in local memory. That is, the process takes an exception when the TLB miss occurs, goes to the page tables (in the kernel data section), finds the table entry, writes to TLB, then the process is allowed to proceed. But if the memory reference shows a TLB miss, and the page tables show the corresponding physical address is in global memory (over 8M physical address), the TLB entry is made for this page, and when the process resumes it will find the page entry in the TLB as before; yet another exception is taken because the valid bit will be zero, indicating the page is physically not in local memory, so this time the exception will enter a routine to swap the page from gobal to local and validate the TLB entry, so execution can then proceed. In the third situation, if the page tables show address for the memory reference is on disk, not in local or global memory, then the system operates as indicated above, i.e., the process is put off the run queue and put in the sleep queue, a disk request is made, and when the disk has transferred the page to global memory and signalled a command-complete interrupt, then the page is swapped from global to local, and the TLB updated, then the process can execute again.

Figure 12:
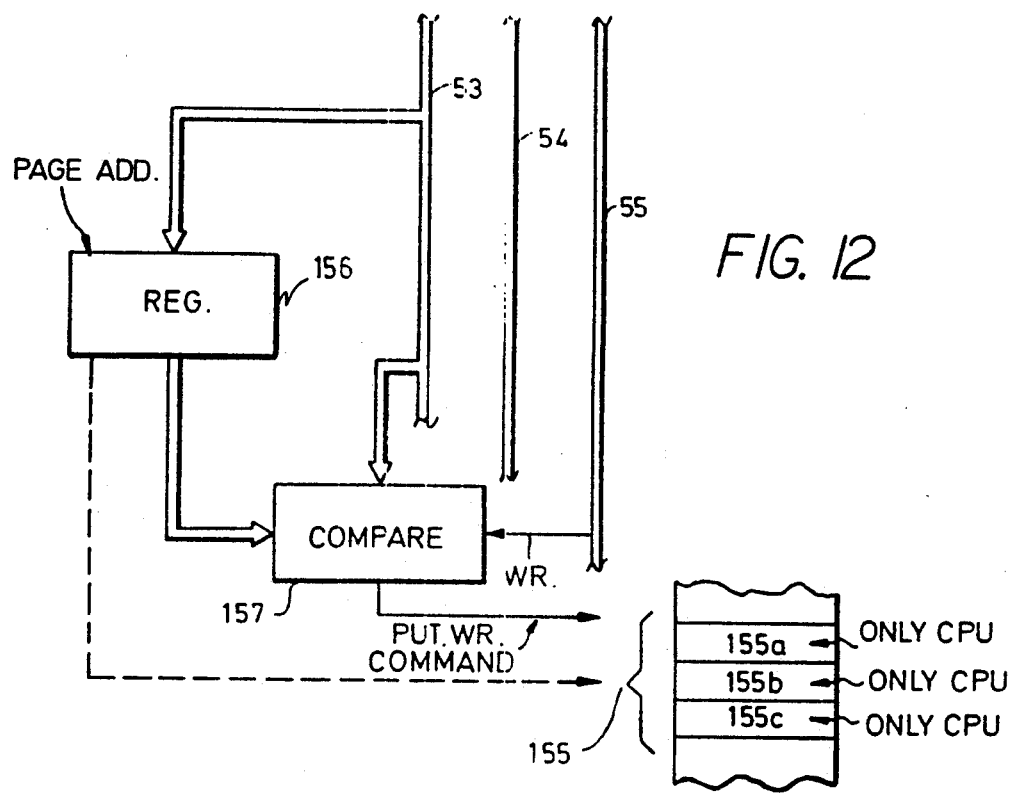
FIG. 12 is an illustration of the private memory locations in the memory map of the global memory modules in the system of FIGS. 1, 2, 3 and 4.

Private Memory:

Although the memory modules 14 and 15 store the same data at the same locations, and all three CPUs 11, 12 and 13 have equal access to these memory modules, there is a small area of the memory assigned under software control as a private memory in each one of the memory modules. For example, as illustrated in FIG. 12, an area 155 of the map of the memory module locations is designated the private memory area, and is writable only when the CPUs issue a "private memory write" command on bus 59. In an example embodiment, the private memory area 155 is a 4K page starting at the address contained in a register 156 in the bus interface 56 of each one of the CPU modules; this starting address can be changed under software control by writing to this register 156 by the CPU. The private memory area 155 is further divided between the CPUs; only CPU-A can write to area 155a, CPU-B to area 155b, and CPU-C to area 155c. One of the command signals in bus 57 is set by the bus interface 56 to inform the memory modules 14 and 15 that the operation is a private write, and this is set in response to the address generated by the processor 40 from a Store instruction; bits of the address (and a Write command) are detected by a decoder 157 in the bus interface (which compares bus addresses to the contents of register 156) and used to generate the "private memory write" command for bus 57. In the memory module, when a write command is detected in the registers 94, 95 and 96, and the addresses and commands are all voted good (i.e., in agreement) by the vote circuit 100, then the control circuit 100 allows the data from only one of the CPUs to pass through to the bus 101, this one being determined by two bits of the address from the CPUs. During this private write, all three CPUs present the same address on their bus 57 but different data on their bus 58 (the different data is some state unique to the CPU, for example). The memory modules vote the addresses and commands, and select data from only one CPU based upon part of the address field seen on the address bus. To allow the CPUs to vote some data, all three CPUs will do three private writes (there will be three writes on the busses 21, 22 and 23) of some state information unique to a CPU, into both memory modules 14 and 15. During each write, each CPU sends its unique data, but only one is accepted each time. So, the software sequence executed by all three CPUs is (1) Store (to location 155a), (2) Store (to location 155b), (3) Store (to location 155c). But data from only one CPU is actually written each time, and the data is not voted (because it is or could be different and could show a fault if voted). Then, the CPUs can vote the data by having all three CPUs read all three of the locations 155a, 155b and 155c, and by having software compare this data. This type of operation is used in diagnostics, for example, or in interrupts to vote the cause register data.

The private-write mechanism is used in fault detection and recovery. For example, if the CPUs detect a bus error upon making a memory read request, such as a memory module 14 or 15 returning bad status on lines 33-1 or 33-2. At this point a CPU doesn't know if the other CPUs received the same status from the memory module; the CPU could be faulty or its status detection circuit faulty, or, as indicated, the memory could be faulty. So, to isolate the fault, when the bus fault routine mentioned above is entered, all three CPUs do a private write of the status information they just received from the memory modules in the preceding read attempt. Then all three CPUs read what the others have written, and compare it with their own memory status information. If they all agree, then the memory module is voted off-line. If not, and one CPU shows bad status for a memory module but the others show good status, then that CPU is voted off-line.

Figure 13:
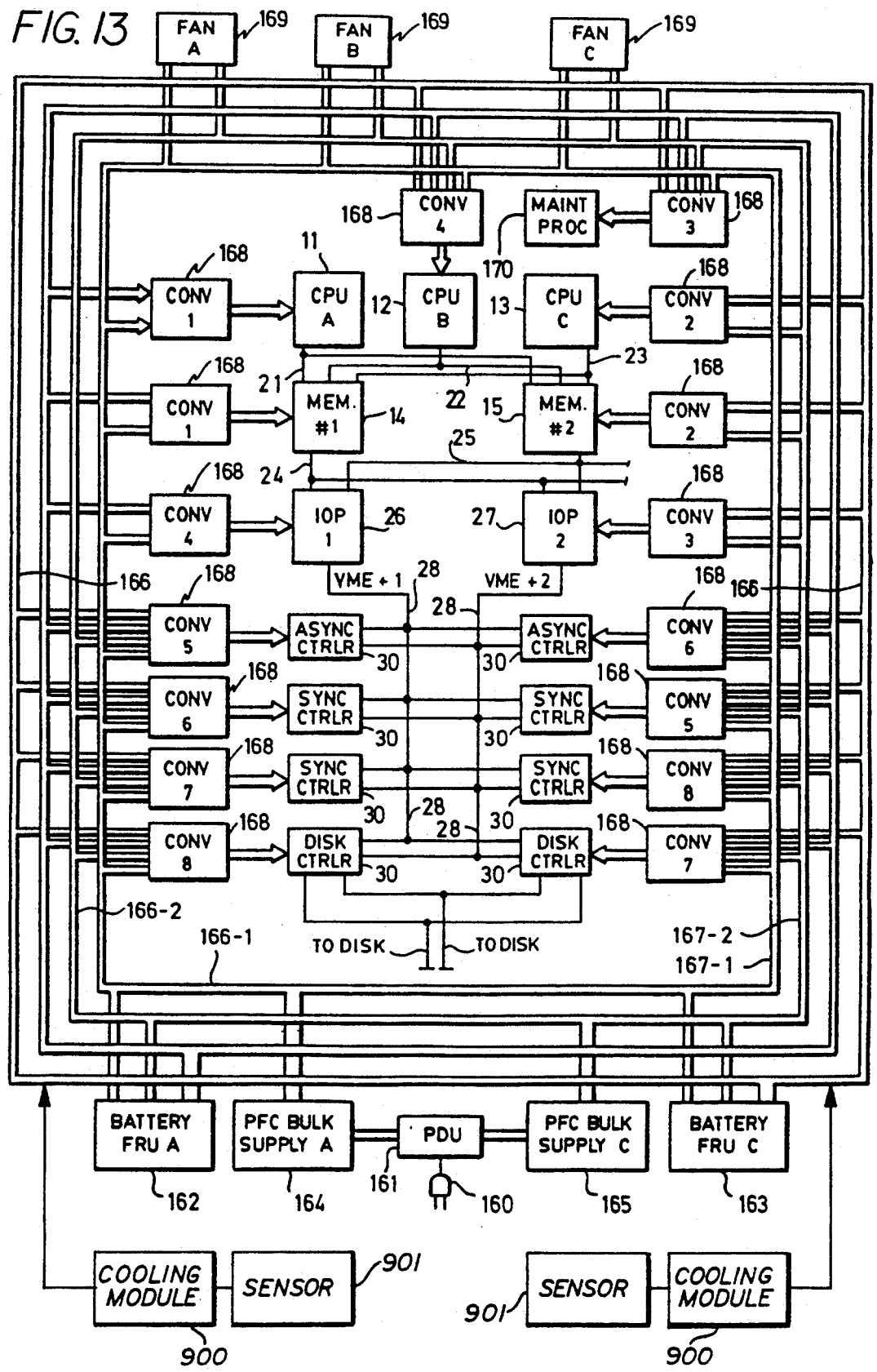
FIG. 13 is a schematic diagram in block form of the system of one embodiment of the invention including a fault-tolerant power supply.

Fault-Tolerant Power Supply:

Referring now to FIG. 13, the system of the preferred embodiment may use a fault-tolerant power subsystem which provides the capability for on-line replacement of failed power supply modules, as well as on-line replacement of CPU modules, memory modules, I/O processor modules, I/O controllers and disk modules as discussed above. In the circuit of FIG. 13, an a/c power line 160 is connected directly to a power distribution unit 161 that provides power line filtering, transient suppressors, and a circuit breaker to protect against short circuits. To protect against a/c power line failure, redundant battery packs 162 and 163 provide sufficient system power so that orderly system shutdown can be accomplished; for example, several minutes of battery power is sufficient in an illustrative embodiment. Only one of the two battery packs 162 or 163 is required to be operative to safely shut the system down.

The power subsystem has two identical AC to DC bulk power supplies 164 and 165 which exhibit high power factor and energize a pair of 36-volt DC distribution busses 166 and 167. The system can remain operational with one of the bulk power supplies 164 or 165 operational.

Four separate power distribution busses are included in these busses 166 and 167. The bulk supply 164 drives a power bus 166-1, 167-1, while the bulk supply 165 drives power bus 166-2, 167-2. The battery pack 162 drives bus 166-3, 167-3, and is itself recharged from both 166-1 and 166-2. The battery pack 163 drives bus 166-3, 167-3 and is recharged from busses 166-1 and 167-2. The three CPUs 11, 12 and 13 and driven from different combinations of these four distribution busses.

A number of DC-to-DC converters 168 connected to these 36-v busses 166 and 167 are used to individually power the CPU modules 11, 12 and 13, the memory modules 14 and 15, the I/O processors 26 and 27, and the I/O controllers 30. The bulk power supplies 164 and 165 also power the three system fans 169, and battery chargers for the battery packs 162 and 163. By having these separate DC-to-DC converters for each system component, failure of one converter does not result in system shutdown, but instead the system will continue under one of its failure recovery modes discussed above, and the failed power supply component can be replaced while the system is operating.

The power system can be shut down by either a manual switch (with standby and off functions) or under software control from a maintenance and diagnostic processor 170 which automatically defaults to the power-on state in the event of a maintenance and diagnostic power failure.

Moreover, in conjunction with dual power subsystems 164, 165 and dual battery backup power subsystems 162, 163, it is contemplated that redundant cooling systems or modules 900 having cooling efficiency sensors 901 operate on the cooling modules 900 such that the efficiency of remaining cooling modules 900 can be increased to compensate for faulty cooling modules 900.

Thus, when operating, the fault tolerant computer system detects an error in a cooling module 900, removes the cooling module 900 without system shutdown and while normal system operation continues, and the cooling module 900 is replaced without system shutdown and while normal system operation continues.

System-bus Error Evaluation:

The sequences used by the CPUs 11, 12 and 13 to evaluate responses by the memory modules 14 and 15 to transfers via buses 21, 22 and 23 (the system-bus) will now be described. This sequence is defined by the state machine in the bus interface units 56 and in code executed by the CPUs.

In case one, of a read transfer, it is assumed that no data errors are indicated in the status bits on lines 33 from the primary memory. The stall begun by the memory reference is not ended until the other (no-primary) memory module responds with an ending status condition or the non-primary memory times out. The stall is terminated by asserting a Ready signal via control bus 55 and 43. If the non-primary memory asserts an acknowledge on line 112 before the time out expires, the ending status is evaluated by the state machine. In no data errors are indicated by either status field (lines 33-1 or 33-2), the memory reference is terminated without any further action.

In case two, for read transfer, it is assumed that no data errors are indicated from the primary memory on lines 33-1 and that the non-primary memory acknowledges and indicates a data error in the status received on lines 33-2. In this situation, the memory reference is ended as in case one and in addition the ending status condition is latched in a register and an interrupt is posted. If either the primary memory and/or the non-primary memory indicate an error on lines 33 other than a data error, than the reference is terminated and the status is latched with an interrupt posted. Another variation of case two is that the non-primary memory fails to assert an acknowledge before the time out expires. In this case, the interrupt is posted along with an indication to software that a time out occurred during a read transfer on the non-primary memory.

In case three, for read transfer, it is assumed that a data error is indicated in status lines 33 from the primary memory or that no response is received from the primary memory. The CPUs will wait for an acknowledge from the other memory, and if no data errors are found in the status bits from the other memory, circuitry of the bus interface 56 forces a change in ownership (primary memory ownership status), then a retry is instituted to see if data is correctly read from the new primary. If good status is received from the new primary (no data error indication), then the stall is ended as before, and an interrupt is posted along with an ownership change indication to update the system (to note one memory bad and different memory is primary). However, if a data error or timeout results from this attempt to read from the new primary, then a bus error is indicated to the processor 40 via control bus 55 and 43.

In case four, for read transfer, if both the primary memory and the non-primary memory indicate a data error in status lines 33-1 and 33-2, or if no response is received from the primary memory and the other memory responds with a status error in lines 33, the stall is ended and a bus error is indicated to the processor 40 via control bus 55 and 43.

For write transfers, with the write buffer 50 bypassed, case one is where no data errors are indicated in status lines 33-1 and 33-2 from either memory module. The stall is ended to allow execution to continue.

For write transfers, with write buffer 50 bypassed, case two is where no data errors are indicated from the primary memory on lines 33-1 and that the non-primary memory acknowledges and indicates a data error in the status received on lines 33-2. In this situation, the memory reference is ended as in case one and in addition the ending status condition is latched in a register and an interrupt is posted. If either the primary memory and/or the non-primary memory indicate an error on lines 33 other than a data error, than the reference is terminated and the status is latched with an interrupt posted. Another variation of case two is that the non-primary memory fails to assert an acknowledge before the time out expires. In this case, the interrupt is posted along with an indication to software that a time out occurred during a write transfer on the non-primary memory.

For write transfers, with write buffer 50 bypassed, case three is where a data error is indicated in status from primary memory, or no response is received from the primary memory. The interface controller of each CPU waits for an acknowledge from the other memory module, and if no data errors are found in the status from the other memory, an ownership change is forced and an interrupt is posted. But if data errors or timeout occur for the other (new primary) memory module, then a bus error is asserted to the processor 40.

For write transfers, with write buffer 50 bypassed, case four is where both the primary memory and the non-primary memory indicate a data error in status lines 33-1 and 33-2, or if no response is received from the primary memory and the other memory responds with a status error in lines 33, the stall is ended and a bus error is indicated to the processor 40 via control bus 55 and 43.

For write transfers, with write buffer 50 enabled so the processor 40 is not stalled by a write operation, case one is with no errors indicated in the status from either memory module. The transfer is ended, so another bus transfer may begin.

For write transfers, with write buffer 50 enabled, case two is where no data errors are indicated from the primary memory on lines 33-1 and that the non-primary memory acknowledges and indicates a data error in the status received on lines 33-2. In this situation, the memory reference is ended as in case one and in addition the ending status condition is latched in a register and an interrupt is posted. If either the primary memory and/or the non-primary memory indicate an error on lines 33 other than a data error, than the reference is terminated and the status is latched with an interrupt posted. Another variation of case two is that the non-primary memory fails to assert an acknowledge before the time out expires. In this case, the interrupt is posted along with an indication to software that a time out occurred during a write transfer on the non-primary memory.

For write transfers, with write buffer 50 enabled, case three is where a data error is indicated in status from primary memory, or no response is received from the primary memory. The interface controller of each CPU waits for an acknowledge from the other memory module, and if no data errors are found in the status from the other memory, an ownership change is forced and an interrupt is posted. But if data errors or timeout occur for the other (new primary) memory module, then an interrupt is asserted to the processor 40 and the transfer is ended.

For write transfers, with write buffer 50 enabled, case four is where both the primary memory and the non-primary memory indicate a data error in status in lines 33-1 and 33-2, or if no response is received from the primary memory and the other memory responds with a status error in lines 33, the transfer is ended and an interrupt is indicated to the processor 40 via control bus 55 and 43.

Once it has been determined by the mechanism just described that a memory module 14 or 15 is faulty, the fault condition is signalled to the operator, but the system can continue operating. The operator will probably wish to replace the memory board containing the faulty module, which can be done while the system is powered up and operating. The system is then able to re-integrate the new memory board without a shutdown. This mechanism also works to revive a memory module that failed to execute a write due to a soft error but then tested good so it need not be physically replaced. The task is to get the memory module back to a state where its data is identical to the other memory module. This revive mode is a two step process. First, it is assumed that the memory is uninitialized and may contain parity errors, so good data with good parity must be written into all locations, this could be all zeros at this point, but since all writes are executed on both memories the way this first step is accomplished is to read a location in the good memory module then write this data to the same location in both memory modules 14 and 15. This is done while ordinary operations are going, on interleaved with the task being performed. The CPUs treat a memory in revive state just as if it were in the online state, but writes originating from the I/O busses 24 or 25 are ignored by this revive routine in its first stage. After all locations have been thus written, the next step is the same as the first except that I/O accesses are also written; that is, I/O writes from the I/O busses 24 or 25 are executed as they occur in ordinary traffic in the executing task, interleaved with reading every location in the good memory and writing this same data to the same location in both memory modules. When the modules have been addressed from zero to maximum address in this second step, the memories are identical. During this second revive step, both CPUs and I/O processors expect the memory module being revived to perform all operations without errors. The I/O processors 26, 27 will not use data presented by the memory module being revived during data read transfers. After completing the revive process the revived memory can then be (if necessary) designated primary.

A similar revive process is provided for CPU modules. When one CPU is detected faulty (as by the memory voter 100, etc.) the other two continue to operate, and the bad CPU board can be replaced without system shutdown. When the new CPU board has run its power-on self-test routines from on-board ROM 63, it signals this to the other CPUs, and a revive routine is executed. First, the two good CPUs will copy their state to global memory, then all three CPUs will execute a "soft reset" whereby the CPUs reset and start executing from their initialization routines in ROM, so they will all come up at the exact same point in their instruction stream and will be synchronized, then the saved state is copied back into all three CPUs and the task previously executing is continued.

As noted above, the vote circuit 100 in each memory module determines whether or not all three CPUs make identical memory references. If so, the memory operation is allowed to proceed to completion. If not, a CPU fault mode is entered. The CPU which transmits a different memory reference, as detected at the vote circuit 100, is identified in the status returned on bus 33-1 and or 33-2. An interrupt is posted and a software subsequently puts the faulty CPU offline. This offline status is reflected on status bus 32. The memory reference where the fault was detected is allowed to complete based upon the two-out-of-three vote, then until the bad CPU board has been replaced the vote circuit 100 requires two identical memory requests from the two good CPUs before allowing a memory reference to proceed. The system is ordinarily configured to continue operating with one CPU off-line, but not two. However, if it were desired to operate with only one good CPU, this is an alternative available. A CPU is voted faulty by the voter circuit 100 if different data is detected in its memory request, and also by a time-out; if two CPUs send identical memory requests, but the third does not send any signals for a preselected time-out period, that CPU is assumed to be faulty and is placed off-line as before.

The I/O arrangement of the system has a mechanism for software reintegration in the event of a failure. That is, the CPU and memory module core is hardware fault-protected as just described, but the I/O portion of the system is software fault-protected. When one of the I/O processors 26 or 27 fails, the controllers 30 bound to that I/O processor by software as mentioned above are switched over to the other I/O processor by software; the operating system rewrites the addresses in the I/O page table to use the new addresses for the same controllers, and from then on these controllers are bound to the other one of the pair of I/O processors 26 or 27. The error or fault can be detected by a bus error terminating a bus cycle at the bus interface 56, producing an exception dispatching into the kernel through an exception handler routine that will determine the cause of the exception, and then (by rewriting addresses in the I/O table) move all the controllers 30 from the failed I/O processor 26 or 27 to the other one.

When the bus interface 56 detects a bus error as just described, the fault must be isolated before the reintegration scheme is used. When a CPU does a write, either to one of the I/O processors 26 or 27 or to one of the I/O controllers 30 on one of the busses 28 (e.g., to one of the control or status registers, or data registers, in one of the I/O elements), this is a bypass operation in the memory modules and both memory modules execute the operation, passing it on to the two I/O busses 24 and 25; the two I/O processors 26 and 27 both monitor the busses 24 and 25 and check parity and check the commands for proper syntax via the controllers 126. For example, if the CPUs are executing a write to a register in an I/O processor 26 or 27, if either one of the memory modules presents a valid address, valid command and valid data (as evidenced by no parity errors and proper protocol), the addressed I/O processor will write the data to the addressed location and respond to the memory module with an Acknowledge indication that the write was completed successfully. Both memory modules 14 and 15 are monitoring the responses from the I/O processor 26 or 27 (i.e., the address and data acknowledge signals of FIG. 7, and associated status), and both memory modules respond to the CPUs with operation status on lines 33-1 and 33-2. (If this had been a read, only the primary memory module would return data, but both would return status.) Now the CPUs can determine if both executed the write correctly, or only one, or none. If only one returns good status, and that was the primary, then there is no need to force an ownership change, but if the backup returned good and the primary bad, then an ownership change is forced to make the one that executed correctly now the primary. In either case an interrupt is entered to report the fault. At this point the CPUs do not know whether it is a memory module or something downstream of the memory modules that is bad. So, a similar write is attempted to the other I/O processor, but if this succeeds it does not necessarily prove the memory module is bad because the I/O processor initially addressed could be hanging up a line on the bus 24 or 25, for example, and causing parity errors. So, the process can then selectively shut off the I/O processors and retry the operations, to see if both memory modules can correctly execute a write to the same I/O processor. If so, the system can continue operating with the bad I/O processor off-line until replaced and reintegrated. But if the retry still gives bad status from one memory, the memory can be off-line, or further fault-isolation steps taken to make sure the fault is in the memory and not in some other element; this can include switching all the controllers 30 to one I/O processor 26 or 27 then issuing a reset command to the off I/O processor and retry communication with the online I/O processor with both memory modules live-then if the reset I/O processor had been corrupting the bus 24 or 25 its bus drivers will have been turned off by the reset so if the retry of communication to the online I/O processor (via both busses 24 and 25) now returns good status it is known that the reset I/O processor was at fault. If both memory modules acknowledge with any type of error other than a data error, then the I/O transfer is terminated and a bus error is indicated to the processor. A time out is handled the same way. If the primary responds with a data error and the backup has no data error, then an ownership change is attempted. In any event, for each bus error, some type of fault isolation sequence in implemented to determine which system component needs to be forced offline.

CPU and Memory Error Recovery:

Handling of hardware faults in the CPU and memory subsystem of FIGS. 1-13 is an important feature. The subsystem includes the CPUs 11, 12 and 13 and the memory boards 14 and 15, along with the system-bus, i.e., buses 21, 22 and 23. Whenever the hardware detects some extraordinary event, whether a small glitch such as a memory parity error, or a major subsystem failure (a blown power supply, for instance), the object is to identify the failed component and remove it from the system so that normal operation may quickly resume; at this point no attempt is made to diagnose or reintegrate the failed component. First the error recovery arrangement for the "core" of the system will be discussed, then the error recovery for the I/O buses and I/O controllers.

Hardware Error Exceptions: Hardware error exceptions are indicated by high priority interrupts or by bus errors. In general a high priority interrupt is generated for an error that can be handled asynchronously, i.e. sometime after the current instruction is executed. A few examples are (1) a "take ownership" operation forced by hardware-detected fault on previous primary memory board 14 or 15; (2) Non-data errors on system-bus reads; (3) system-bus reads that suffered a data error on the primary memory 14 or 15, but still could be completed by the backup memory 14 or 15. In these three examples, the kernel is notified of errors from which the hardware has already recovered. In some cases, however, the processor is stalled awaiting the finish of an operation that can never be completed, such as: (1) failed take-ownership operations; (2) system-bus reads and writes that can be completed by neither memory module; (3) data errors on system-bus writes while the write buffer 52 is enabled. Since interrupts can be masked, they can't be relied upon to break a stall; bus errors perform this function.

Even though these two types of hardware error exception are thus distinguished, nevertheless the two can be funneled into one exception handler that doesn't care which type occurred. During its pass through the bus error handler, if a bus error isn't recognized as being caused by 'nofault' or subscription services accesses or as resulting from user stack growth, it is shunted off to the hardware fault code (which happens to be the handler for high priority interrupts). The error status preserved by the system of FIGS. 1-8 is equally valid for either type of exception.

The first error registers to be checked are ones which are potentially asymmetric, since they report failures in processor synchronization.

The CPU_ERR register contains a number of specific bits assigned to indicate certain types of errors, as indicated in the following sub-paragraphs:

CPU_ERR: Interrupt synchronization error-Indicated by CPU_ERR_IS bit. This indicates CPU divergence or the failure of a signal in a CPU's interrupt synchronization logic. If the soft synchronziation test didn't reveal divergence, pursue the fault in synchronization hardware. Response:

---

If the CPU's don't agree on the state of CPU_ERR_IS,
   take the odd CPU offline.
Else,
   soft-vote CPU_SERR and act on bit settings as
described below.

---

CPU_SERR: Interrupt pending inputs-Indicated by: CPU_SERR_CPUaHIGH, CPU_SERR_CPUbHIGH, CPU_SERR_CPUcHIGH, CPU_SERR_CPUaLOW, CPU_SERR_CPUbLOW, CPU_SERR_CPUcLOW, CPU_SERR_CPUaTIM0, CPU_SERR_CPUbTIM0, CPU_SERR_CPUcTIM0, CPU_SERR_CPUaTIM1, CPU_SERR_CPUbTIM1, or CPU_SERR_CPUcTIM1 bits. These bits present a snapshot of the inputs to the interrupt synchronization circuitry 65 of each CPU at the instant the error was flagged. Response:
   If one CPU's version of these four inputs in unique, its synchronization hardware is broken; take it offline.

CPU_ERR: Processor synchronization error-Indicated by: CPU_ERR_PS bit. This indicates CPU divergence or the failure of a signal in a CPU's processor synchronization logic; the soft-sync operation didn't reveal divergence, so pursue the fault in synchronization hardware. Response:

---

If the CPU's don't agree on the state of CPU_ERR_PS,
   take the odd CPU offline.
Else,
   soft-vote CPU_SERR and act on bit settings as
described below.

---

CPU_SERR: Processors stalled-Indicated by: CPU_SERR_CPUaSTALL, CPU_SERR_CPUbSTALL, CPU_SERR_CPUcSTALL bits. These bits present a snapshot of the input to the processor synchronization hardware on each CPU at the instant the error was flagged. Response:
   If one CPU's version of this signal in unique, its synchronization hardware is broken; take it offline.

CPU_ERR: Unassigned CPU space violation-Indicated by: CPU_SERR_USV bit. An unimplemented address within CPU space was written. This may result from failing kernel software or from a fault in the CPU hardware's address decode logic. Note that this is one of the few cases where it does matter whether the exception is a bus error or high priority interrupt.

For USV's, if the write buffer is enabled, a high priority interrupt is generated; else, a buss error. If the errant write goes into the write buffer, the USV will happen asynchronously and so the PC in the exception frame won't pinpoint the gulity instruction. Therefore, the type of exception tells whether to trust the exception PC. Response:

---
If all CPU's show an unassigned space error, the kernel has been corrupted;
    read the bad address from CPU_ERRADDR;
    write CPU_MASK_CUSV to clear the error;
    consult for required action.
Else, if only one CPU shows the error,
    take it offline.

---

CPU_ERR: Write violation in local RAM-Indicated by: CPU_ER-R_WPV bit. A write to a write-protected address was attempted. This may result from failing kernel software or from a fault in CPU or memory module write protect RAM. Just as for Unassigned Space Violations (see above), the exception type tells whether to trust the PC in the exception stack frame. Response:

---
If all CPU's show a write protect violation, the kernel has been corrupted;
    read the bad address from CPU_ERRADDR;
    write CPU_MASK_CWPV to clear the error;
    consult for required action.
Else, if only one CPU shows the error,
    take it offline.

---

CPU_ERR: Dual rail faults-Indicated by: CPU_ERR_CPUaDRF, CPU_ERR_CPUbDRF, CPU_ERR_CPUcDRF, CPU_ERR_IOP0DRF, CPU_ERR_IOP1DRF or CPU_ERR_MPDRF bits. The failure can be at the signal's source, on the backplane, or on an individual CPU. CPU_ERR describes dual rail faults from all sources but the memory module 14 and 15. Since there are too many different dual rail signals coming from memory module to fit in CPU_ERR, these fault bits are located in the system-bus status registers, CPU_RSBa and CPU_RSBc. Response:

---
If all three CPU's concur that a particular DRF is present,
    disable the source of the bad signal.
Else,
    disable the odd CPU (since the signal was driven inactive
        by the detection of the fault, it is likely that the
        signal's source will be disabled in the future, even
        though the culprit was a bad CPU).

---

CPU_ERR: Power system state change interrupt-Indicated by: CPU_ERR_POWER bit. Response:

Read CPU_POWER and act on bit settings as described below.

CPU_POWER: Bulk regulator and battery status-Indicated by: CPU_POWER_BATTaSTS1, CPU_POWER_BATTaSTS2, CPU_POWER_BATTcSTS1, CPU_POWER_BATTcSTS2, CPU_POWER_BULKaSTS1, CPU_POWER_BULKaSTS2, CPU_POWER_BULKcSTS1, CPU_POWER_BULKcSTS2, CPU_POWER_BATTaMON1, CPU_POWER_BATTaMON2, CPU_POWER_BATTcMON1, CPU_POWER_BATTcMON2, CPU_POWER_BULKaMON1, CPU_POWER_BULKaMON2, CPU_POWER_BULKcMON1, or CPU_POWER_BULKcMON2 bits. In this register, STS bits set to one indicate components which are physically present; the MON bits are writable masks which are initially set to the same state as their corresponding STS bits. A high priority interrupt is generated if any MON line doesn't match its STS line. Note that these double-line signals are not dual rail signals; any STS lines 1 and 2 should always match. Response:

---
save the current MON bits;
read the current STS bits and write them to the MON bits
    (masking this power state change interrupt);
compare the saved MON bits with the current STS bits;
if either STS line for any battery or bulk regulator has changed.
    call the powerfail interrupt handler.

---

CPU_ERR: Core module present state change interrupt-At least one of the CPUs, memory modules, or I/O processors has been removed or replaced. By comparing the current module-present bits in CPU_CFG to their previous state (saved by the kernel), the missing/added component can be identified. Response:

---
If a memory module or I/O Processor board has been removed,
    hold in reset;
    mark it as absent;
    remove from/config.;
If a CPU board has been removed,
    mark it as absent,
    remove from/config.

---

The kernel saves the state of CPU_CFG when returning from hardware exceptions. With this as a reference, configuration changes (boards failed, pulled, reinserted, batteries rejuvenated, and so forth) can be noticed by comparing the current and the saved versions of CPU_CFG when the next hardware exception is taken.

CPU_ERR: Both memory module primary error-Both memory modules claim to be primary. This is probably a result of a failed take-ownership operation. Upon detection of both memory module's primary, the CPU's complement the would-be system-bus ownership bits to switch back to the pre-take-ownership operation primary. Response:

Soft-reset the backup and take it offline.

CPU_ERR: memory module primary and revive error-A memory module 14 or 15 claims to be both primary and in revive mode, probably due to a picked bit in the indicated memory module's control register; could also be a dual rail fault on memory module Primary. Response:

Perform take-ownership, soft-reset the backup, and take it offline.

CPU_ERR: TMRC timeout bits-Indicated by: CPU_ERR_TMRCaTMOR, CPU_ERR_TMRCcTMOR, CPU_ERR_TMRCaTMOTS, CPU_ERR_TMRCcTMOTS, CPU_ERR_TMRCaTMOW, or CPU_ERR_TMRCcTMOW bits. Not to be confused with CPU_RSB_TMO, indicating one or more CPU's were timed out, these bits describe reasons the system-bus timed out one of the memory module 14 or 15. This may be the result of self-checking logic on the memory modules causing the board to halt because an internal error was detected. There is no other indicator of memory module internal errors. Response:

Soft-reset the memory module and take it offline.
CPU_ERR: RSB error - Indicated by: CPU_ERR_RSBa, CPU_ERR_RSBc bits. Response:
    For either or both CPU_ERR_RSBx bits set,
        read corresponding CPU_RSBx register and act on bit
        settings as described below.

CPU_RSBx: Data vote error-Indicated by: CPU_RSB_ANY or CPU_RSB_CPUx bits. One CPU's data miscompares with the others; data could have been take-ownership, Module Present DRF, or system-bus parity signals. Response:
Take CPUx offline.

CPU_RSBx: CPU timeout-Indicated by: CPU_RSB_ANY, CPU_RSB_TMO, or CPU_RSB/CPUx bits. Indicated CPU was the only one to miss (or only one to initiate) an system-bus request or a take-ownership. Response:
Take CPUx offline.

CPU_RSBx: Data error-Indicated by: CPU_RSB_ANY or CPU_RSB_DATA bits. This can be any of several faults: (1) Access to valid but absent (uninstalled) global memory; (2) Access to non-existent global memory address; (3) Write protect violation in global memory; (4) Data error (parity error in data from memory). Response:

Read TMRC_ERR;
if none of TMRC_ERR_ABSENTRAM, TMRC_ERR_NEXISTRAM, or TMRC_ERR_WPV are set, assume
    the data error,
    perform take-ownership if necessary, making the failed
        memory module backup;
    soft-reset the backup;
    take the backup offline.

TMRC_ERR: Access to uninstalled global RAM-Indicated by: TMRC_ERR_ABSENTRAM bit. Response:
    Perform action analogous to that for local RAM write protect violations.

TMRC_ERR: Access to non-existent global RAM-Indicated by: TMRC_ERR_NEXISTRAM bit. Response:
    Perform action analogous to that for local RAM write protect violations.

TMRC_ERR: Write protection violation in global RAM-Indicated by: TMRC_ERR_WPV or TMRC_ERR_CPU bits. This error can be caused by CPU access or by a VME master writing into global RAM; TMRC_ERR_CPU tells which is the culprit. The address of the attempted write is latched in TMRC_ERR_ADDR. Response:

If the CPU initiated the write,
    perform action analogous to that for local RAM write
    protect violations;
else,
    treat as a master access fault.

CPU_RSBx: Bypass error-Indicated by: CPU_RSB_ANY, CPU_RSB_RIOB or CPU_RSB_DATA bits. The I/O processor returned bad status or the memory module detected a parity error on data read from the I/O processor. The problem could stem from the memory module or from the I/O-bus interface logic on the I/O processor. Another possibility is that the other I/O processor sharing the I/O-bus has failed in such a way that is is causing I/O-bus operations to fail. Response:

If both system-bus's show the RIOB/IOP bit set,
    take the I/O processor out.
Else,
    If the memory module showing these system-bus status
        bits isn't primary,
        perform take-ownership;
    select the other I/O processor;
    if bypass operations succeed,
        disable the I/O processor;
    else,
        soft-reset the memory module and take it offline.

CPU_RSBx: Bypass timeout-Indicated by: CPU_RSB_ANY, CPU_RSB_RIOB, CPU_RSB_DATA or CPU_RSB_TMO bits. An I/O processor 26 or 27 didn't respond to a bypass operation. As above, the problem could be caused by the memory module or by the I/O-bus interface logic on the I/O processor. Response:

If both system-bus's show the TIMEOUT bit set,
    take the I/O processor out.
Else,
    if the memory module showing these system-bus status
        bits isn't primary,
        perform take-ownership;
    select the other I/O processor;
    if bypass operations succeed,
        disable the I/O processor;
    else,
        soft-reset the memory module and take it offline.

CPU_RSBx: Timeout on one RIOB and one CPU-Indicated by: CPU_RSB_ANY, CPU_RSB_RIOB, CPU_RSB_DATA, CPU_RSB_TMO, or CPU_RSB_CPUx bits. There are several possibilities: (1) A bypass error (see above) accompanied by a CPU timeout; (2) a bypass timeout (see above) with a vote fault; (3) an I/O processor and CPU that timed out separately. Response:
Take CPUx offline and retry the operation, hoping to produce one of the simpler cases.

CPU_RSBx: Dual rail faults-Indicated by: CPU_RSB_PRIDRF, CPU_RSB_HIGHDRF, CPU_RSB_LOWDRF, CPU_RSB_TIM1DRF, CPU_RSB_TIM0DRF, CPU_RSB_CPUaONLDRF, CPU_RSB_CPUbONLDRF, CPU_RSB_CPUcONLDRF, CPU_RSB_TMRCaONLDRF, CPU_RSB_TMRCcONLDRF, CPU_RSB_REVDRF or CPU_RSB_PRESDRF bits. If CPU_RSB_PRESDRF (the module-present dual rail fault) has failed, since it qualifies all the rest, no dual rail faults from the memory module will be asserted. Response:

If the other system-bus agrees with the dual rail faults found here,
    disable the source of the signal;
else,
    soft-reset the memory module and take if offline.

CPU_ERR: Hardware ownership change-Indicated by: CPU_ERR_TOS bit. A take-ownership operation was forced by hardware in response to an system-bus error. Should also see CPU_ERR_RSBa or CPU_ERR_RSBc set. Response:

Act upon CPU_RSB status bits for the indicated system-bus.
CPU_ERR: No bits set. Response:
    Check for memory module errors.

TRMC_CAUSE: Inter-TMRC communication error-Indicated by assigned bit. An error was detected in the communication between the primary and backup TMRC's. Response:
    Soft-reset the backup TMRC and take it offline.

TMRC_CAUSE: Refresh counter overflow-Indicated by assigned bit. Global RAM hasn't been refreshed within the timeout period implemented by the refresh counter.

TMRC_CAUSE: CPU module present dual rail fault-Indicated by assigned bits (one bit per CPU). Error in module present signal from one CPU. Response:
    Take the indicated CPU offline.

TMRC_CAUSE: RIOB timeout-Indicated by assigned bit. The I/O-bus arbiter granted the bus to an I/O processor that never acknowledged the grant. Response:
    Disable the indicated I/O processor.

Some of the bits in the foregoing subparagraphs have the following meanings:

CPU_RSB_ANY One or more of the other seven error bits is set; aka "bit <6>".
CPU_RSB_DATA Either invalid data was read or data couldn't be correctly written; aka "bit <6>".
CPU_RSB_RIOB Error on IOP or in RIOB interface logic; aka "bit <4>".
CPU_RSB_TMO One or more CPU's were timed out during RSB operation, or there was an RIOB error on a bypass operation; aka "bit <3>".
CPU_RSB_CPUa CPU a is suspected in RSB error; aka "bit <2>".
CPU_RSB_CPUb CPU b is suspected in RSB error; aka "bit <1>".
CPU_RSB_CPUc CPU c is suspected in RSB error; aka "bit <0>".

I/O Subsystem Fault Detection, Error Recovery and Reintegration:

Each of the I/O processors 26, 27, is a self-checked, fail-fast controller, the purpose being to minimize risk to the core of the system during a hardware failure. Combined with the BIM 29, each I/O processor 26, 27 also protects the CPU and Memory Subsystem from errant VME controllers 30. Unlike CPU/memory subsystem failures, software is solely responsible for recovering from an I/O processor 26, 27 failure and providing the redundancy necessary to recover from such a fault. The recovery procedure for various known I/O processor 26, 27 and controller 30 faults will be described in the following paragraphs.

The purpose here is to describe the handling of faults within the I/O subsystem of the system of FIGS. 1-8. When a fault in the I/O subsystem occurs, the primary goal is to identify the failed component, i.e., an I/O processor 26, 27, or I/O controller 30, or I/O device 148 and to remove it from the system configuration so that normal operation can resume.

In the following sections, headings are formed from two components: a register name and an error condition that can be described by the register. Names for registers and their bits come from the kernel's C language header files for the CPU and I/O processor 26, 27 boards. The pertinent bits within the register are listed under an "Indicated by:" subheading. The list of bits is normally followed by a brief explanation of the error. The section is concluded by a description of the appropriate response or procedure, whether to take immediate action or to gather more information.

I/O Processor Recovery Strategies: When an I/O processor 26, 27 fails, the kernel switches the I/O controllers 30 to the other bus 28 for the other controller 26 or 27 before resetting the failed IOP controller 26 or 27. The process to switch a controller is as follows:

a) Acquire the bus 28 of the good I/O processor 26 or 27.
b) Call an identification routine of each device connected to the failed I/O processor. The identification routine should, at a minimum, probe the controller 30 to see if it responds.
c) If the identification routine fails, Take the controller 30 off-line. It could not be switched over.
d) After switching all the controllers 30, release the bus 28.
e) Merge the bad I/O processor's registers with the good I/O processor's registers. All I/O processor registers are mirrored in local memory 16 so that the old values are available if the I/O processor fails.
f) Place the bad I/O processor in reset.
g) If the exception type was a bus error and not a high priority interrupt and the instruction that was bus errored is a write to an I/O processor register,
    Change the contents of the source register to reflect a possibly new value in the target I/O processor register and restart the last instruction.

I/O Controller Recovery Strategies: The architecture of the system of FIG. 1 does not provide for replicated I/O controllers 30. There are features provided in the operating system, such as disk mirroring, that allow the system to continue when an I/O controller 30 fails. The kernel also provides services to device drivers to detect and handle hardware faults (bus errors, parity errors, and access errors, for example). In addition, the device drivers are responsible for detecting software or firmware errors associated with their I/O controller 30. Some of the services provided are:

iobuscopyin and iobuscopyout protect the device driver from bus errors, parity errors, and time outs (otherwise, the device driver must detect these events). They also simplify the driver's interface to the I/O processor's hardware.

Subscription services for errors asynchronous to the CPU and for bus errors, parity errors, and time outs when the device driver chooses to bypass the iobuscopyin and iobuscopyout functions.

Recovery techniques to back out of an instruction stream when a controller 30 fails.

When an I/O controller 30 fails, the operating system loses the resources that the controller provided. Any system calls using those resources fail unless the resource is replicated in software. In one embodiment, disk drives 148 are the only replicated peripheral devices in the system. Other embodiments may have replicated ethernet or other communications devices such that a single failed I/O controller 30 will not impact system availability on a network.

Particularly in the embodiment wherein disk drives or disk drive modules 148 are replicated peripheral devices in the system, it is contemplated that a faulty disk drive 148 is attached to I/O Controller 30 such that faulty disk drive 148 can be isolated and powered down until the faulty disk drive 148 is removed and replaced.

Moreover, it is contemplated that the present fault tolerant computer system is operable such that the following steps occur:
(1) An error is detected in disk drive 148;
(2) Disk drive 148 is isolated and powered down;
(3) Normal system operation is continued using the mirror for disk drive 148.

I/O processor Hardware Error Exceptions-Indicated by: I/O processor High Priority Interrupts, or CPU Bus Errors. In general, a high-priority interrupt is generated whenever the I/O processor determines that an error occurs asynchronous to current CPU activity. Some examples of these kinds of error are: (1) Invalid access to the memory board 14 or 15 from a controller 30; (2) Invalid parity on the bus 28; (3) Invalid request from a controller 30. In each of those examples, a minimum amount of recovery has been performed by the I/O processor hardware. It is up to the kernel to kick-off the services to recover from the fault or to designate a component as failed.

When the CPU is accessing the I/O processor 26 or 27 or accessing an I/O controller 30, an I/O processor or controller failure may result in bad status being returned to the CPU board. When the CPU 11, 12 and 13 receives bad status, a bus error trap is generated by the processor. Some examples of these kinds of errors are: (1) Invalid parity on the bus 28; (2) controller 30 not present or failed; (3) I/O processor 26 or 27 not present or failed.

The manner in which the kernel detects an I/O processor or controller 30 failure determines the algorithm to recover. When a high-priority interrupt is captured, the kernel must determine the type of fault (I/O processor or controller), and take failed components off-line. Any recovery beyond this action is fault specific. When a bus error occurs, the kernel must always inspect the target address for a store instruction to an I/O processor register. The target address is the address on the bus when the bus error exception occurred. It is acquired by disassembling the instruction that was executing when the bus error occurred. The I/O processor register may have been modified by the recovery process and if the write were to complete without change, it could incorrectly destroy some important bits.

High Priority Interrupts-Indicated by: TMRC—CAUSE—IOP0HIGH or TMRC—CAUSE—IOP1HIGH bits. A high-priority interrupt is generated whenever the I/O processor detects an error within its own logic or an error in the path to or from a controller 30. Response:

Select the interrupting I/O processor on the memory module and call the I/O processor's handler.

---
Read the I/O processor's interrupt cause register.
If the memory module times out the read,
    Move all the controllers on the I/O processor to the other, functioning I/O processor.
    Place the I/O processor in reset.
    Exit the interrupt handler.
Check each bit in the interrupt cause register, and if
    active, call the appropriate fault handler.
Exit the interrupt handler.

---

IOP—IICAUSE: Controller Bus Hog Time-out-Indicated by: IOP—IICAUSE—BUSHOG bit. A controller 30 has held the bus 28 for a very long time and the timer maintained by the I/O processor 26 or 27 has expired. Response:

---
Notify any subscribers of the bus hog error for the indicated slot.
    If there is no subscriber or the subscriber returns 0,
        take the controller 30 off-line.
    If the subscriber returns 1,
        just clear the interrupt.

---

IOP—IICAUSE: Level 2 fault-Unsupported Request-Indicated by: IOP—IICAUSE—LEVEL2 bit. The controller 30 has presented the I/O processor with a request that is not supported. It could be an invalid address modifier, an A16 master access, or an unsupported A32 address. Response:

---
Notify any subscribers of the level 2 fault for the indicated slot.
    If there is no subscriber or the subscriber returns, 0,
        take the controller 30 off-line.
    If the subscriber returns 1,
        just clear the interrupt.

---

IOP—IICAUSE: Access Validation Fault-Indicated by: IOP—IICAUSE—AV bit. A controller 30 has attempted to access a physical address that has not been prepared for it by the CPU (the controller does not have the proper read/write permissions or slot number set up in the access validation RAM on the I/O processor). Response:

---
Notify any subscribers of the access validation fault.
    If there is no subscriber or the subscriber returns, 0,
        take the controller 30 off-line.
    If the subscriber returns 1,
        clear the interrupt.

---

IOP—IICAUSE: Protocol Violation-Indicated by: IOP—IICAUSE—PROTO bit. The controller 30 presented the I/O processor with an invalid set of bus signals. The controller 30 may have failed. Response:

---
Notify any subscribers of the protocol fault for the indicated slot.
    If there is no subscriber or the subscriber or returns 0,
        take the controller 30 off-line.
    If the subscriber returns 1,
        clear the interrupt.

---

IOP—IICAUSE: parity error-Slave state machine-Indicated by: IOP—IICAUSE—VME—S—PAR bit. The I/O processor detected bad parity from the controller 30. In this case, the controller was performing an operation and the data, address, or control parity was not correct. Response:

---
Notify any subscribers of the parity error for the indicated slot.
    If there is no subscriber or the subscriber or returns 0,
        take the controller 30 off-line.
    If the subscriber returns 1,
        just clear the interrupt.

---

IOP—IICAUSE: Bad Parity on the I/O-bus-Indicated by: IOP—IICAUSE—RIOB0PAR or IOP—IICAUSE—RIOB1PAR bits. A parity error was detected by the I/O processor 26 or 27 when accessing global memory 14 or 15. If both I/O-buses 24 and 25 present the error, then the I/O processor is at fault. If only one I/O-bus presents the error, then the memory module 14 or 15, the I/O-bus, or the I/O processor may be at fault. The memory module will be taken off-line as it may have stale data. Time to further isolate this fault should be scheduled at a later time. Response:

```
If both I/O-buses present the parity error,
    Switch all controllers to the other I/O processor.
    Take the indicated I/O processor off-line.
If only one I/O-bus presents the parity error,
    Take the indicated memory module off-line.
Notify any subscribers of the I/O-bus parity error.
```

IOP_IICAUSE: The I/O-bus timed out an I/O processor request-Indicated by: IOP_IICAUSE_RIOB0TIME or IOP_IICAUSE_RIOB1TIME bits. A memory module did not respond to an I/O processor request. If both I/O-buses timed out, the I/O processor probably failed. If only one I/O-bus timed out, then the memory module, the I/O-bus, or the I/O processor may be at fault. The memory module will be taken off-line as it may have stale data. Time to further isolate this fault should be scheduled at a later time. Response:

```
If both I/O-buses timed out,
    Switch all controllers to the other I/O processor.
    Take the indicated I/O processor off-line.
If only one I/O-bus timed out,
    Take the indicated memory module off-line.
Notify any subscribers of the I/O-bus time out.
```

IOP_IICAUSE: Bad Status from the memory module returned to the I/O processor-Indicated by: IOP_IICAUSE_MEM0 or IOP_IICAUSE_MEM1 bits. An access to non-existent global memory, a write to protected global memory, or bad parity on an operation to global memory can cause the memory module to generate bad status to the I/O processor. If both memory modules returned bad status, the source of the request, a controller 30, may have failed. If only one memory module returned bad status, then the memory module, the I/O-bus, or the I/O processor may be at fault. The memory module will be taken off-line as it may have stale data. Time to further isolate this fault should be scheduled at a later time. Response:

```
If both memory modules return bad status,
    Determined the faulty controller 30 access from the I/O
        processor's error registers and the access
        validation.
    Notify any subscribers of the bad status.
    If there is no subscriber or the subscriber returns 0,
        take the indicated controller 30 off-line.
    If the subscriber returns 1,
        just clear the interrupt.
If only one memory module returned bad status,
    Take the indicated memory module off-line.
    Notify any subscribers of the bad status.
```

IOP_IICAUSE: A I/O-bus grant timed out-Indicated by: IOP_IICAUSE_RIOBGTIME bit. A I/O-bus grant was not received before the time out interval. When the I/O processor requested the I/O-bus, the primary memory module did not respond with the grant signal. The primary memory module or the I/O-bus may be at fault. Response:

Notify any subscribers of the timed out I/O-bus.
Make the backup memory module primary.

CPU Bus Errors- When the CPU is accessing registers on the I/O processor 26 or 27 or controllers 30 on the bus 28, the kernel must be prepared to receive a bus error. If the I/O processor times out an access to a controller 30 or detects some kind of error, it will generate bad status back to the memory module 14 or 15. Bits in the I/O processor's cause register can be used to isolate the error. The memory module can also time out the I/O processor, resulting in a bad status being returned to the CPU. To recover from a bus error, the kernel, after changing the configuration, must re-run the last instruction, or return execution to some known point in the previously executed instruction stream. The "known point" must be in the same thread as the error condition so that stack and user pages are properly mapped when restarted.

CPU_RSBx: Parity error on the I/O-bus-Indicated by: CPU_RSBx_ANY, CPU_RSB_RIOB or CPU_RSB_DATA bits. The memory module detected a parity error on a data read from the I/O processor. If the error happened on both I/O-bus interfaces, the I/O processor has a failure. If the parity error is reported on only one I/O-bus interface, either a memory module, the I/O-bus, or one of the I/O processors failed. At least one memory module was able to get good status so a bus error is not generated. Instead, this error is reported via an interrupt. Response:

```
If the parity error is reported by both I/O-bus interfaces,
    Notify any subscribers of the failed IOP.
    Take the indicated IOP off-line.
If the parity error is reported on one I/O-bus interfaces,
    Probe the other I/O processor.
    If the probe fails,
        Take the indicated memory module off-line.
    If the probe succeeds,
        Notify any subscribers of the failed IOP.
        Take the indicated I/O processor off-line.
```

CPU_RSBx, IOP_IICAUSE, IOP_STS: The BIM detected a parity error-Indicated by: CPU_RSBx_ANY, CPU_RSB_RIOB, CPU_RSB_DATA, IOP_IICAUSE_XFER and IOP_STS_SYSFAIL bits. The BIM 29 detected bad parity from the I/O processor 26 or 27 and isolated the controller 30 from the bus 28. The actual error is similar to a bus timeout except that an additional error indication is asserted by the BIM. The controller must be switched to the other I/O processor to recover the controller. Response:

```
Notify any subscribers of the parity error for the indicated slot.
    If there is no subscriber or the subscriber returns 0,
        take the controller 30 off-line.
    If the subscriber returns 1,
        exit the bus error exception.
```

CPU_RSBx, IOP_IICAUSE: Bus parity error-Master state machine-Indicated by: CPU_RSBx_ANY, CPU_RSB_RIOB, CPU_RSB_DATA and IOP_IICAUSE_M_PAR bits. The I/O processor detected bad bus parity from the controller 30. In this case, the CPU was performing a "read" when a parity error was detected on the data lines from the controller 30. Response:

```
Notify any subscribers of the parity error for the indicated
     slot.
  If there is no subscriber or the subscriber returns 0,
     take the indicated controller 30 off-line.
  If the subscriber returns 1,
     exit the bus error exception.
```

CPU_RSBx, IOP_IICAUSE: VMEbus time out-Controller access time out-Indicated by: CPU_RSBX_ANY, CPU_RSB_RIOB, CPU_RSB_DATA and IOP_IICAUSE_XFER bits. The I/O processor timed out a request to a controller 30 or the controller responded with a bus error. Response:

```
Notify any subscribers of the bus error for the indicated
     slot.
  If there is no subscriber or the subscriber returns 0,
     take the controller off-line.
  If the subscriber returns 1,
     exit the bus error exception.
```

CPU_RSBx IOP_IICAUSE: I/O-bus I/O processor Select Parity Error-Indicated by: CPU_RSBx_ANY, CPU_RSB_RIOB, CPU_RSB_DATA, CPU_RSB_TMO and IOP_IICAUSE$_{13}$ RIOBIO_SEL bits. The I/O processor detected bad parity on the I/O processor select bits from the memory module when the CPU is attempting a transparent bypass operation to a VME controller 30. Response:

```
Read the I/O processor cause register on the other I/O processor.
If the other I/O processor saw the parity error on the select bits,
   Switch the primary memory module to backup.
   Exit the Bus Error Exception and retry the last instruction.
If the other I/O processor did not see the parity error on the
   select bits, switch the controllers to the
      other I/O processor.
   Take the I/O processor off-line.
```

Reintegration of Memory and CPU

The fault tolerant computer system of FIGS. 1-13 is able to detect and isolate component failures without a total loss of the services of the system. Reintegration, the process of adding a new or failed component (board) to the system while the system is running, is fundamental to operation as a fault tolerant system. The reintegration into the system of CPU boards 11, 12 and 13, and memory boards 14 and 15 will now be discussed, beginning at the time immediately after a fault has been isolated through the time a component is brought back online.

When a faulty component is detected the component is reset and taken offline. To bring the component back online a reintegration of that component is required. The reintegration can be automatic, in which case the operating system attempts to reintegrate the failed component without intervention by the user, or it can be manual, at the request of a user-level program.

The reintegration process is a sequence of steps that are taken after the decision to reintegrate a component has been made. The code executed to implement the reintegration process performs the role of restoring system state after one of the following is diagnosed: (1) a bad CPU 11, 12 or 13; (2) a bad memory board 14 or 15; or (3) a bad memory page. The diagnosis is performed by an error interrupt subsystem based upon status information reported by the individual components, as discussed above. The error interrupt subsystem takes whatever action is necessary to put the system in a safe state—this usually means putting a failed component offline and in reset or powered off.

The reintegration process, in summary, is a sequence of events occurring when a component fails, generally as follows:

```
Interrupt occurs indicating a component failure:
   Bad CPU 11, 12 or 13
   Bad memory 14 or 15 (or bad memory page)
If bad CPU board 11, 12 or 13:
   put bad CPU offline and reset
   continue normal operation
   when offline CPU indicates successful completion
   of power-on
         self-test:
         allocated page in global memory for LMR
            (local memory reintegration) routine
            and valid-page-bitmap
         allocate page in global memory for LMR copy procedure
         build bitmap of vaild pages
         save state
         build data structure shared with PROM
         reset all CPUs 11, 12 and 13
         (PROM code brings control back to here after reset)
         restore state
         LMR:
            for each page in local memory 16
               if valid bit set in valid-page-bitmap
                  DMA copy page to reserved page
                     in global memory
                  verify anticipated vote error
                  DMA copy page back to local
                     memory
                  verify no error
         clean up (free LMR routine and its global page)
         done, continue with normal operation
If bad memory:
   if just a bad page, remap it
   else, put memory offline and in revive state
      copy all memory pages to themselves
      if no errors, bring back online
```

Figure 14:
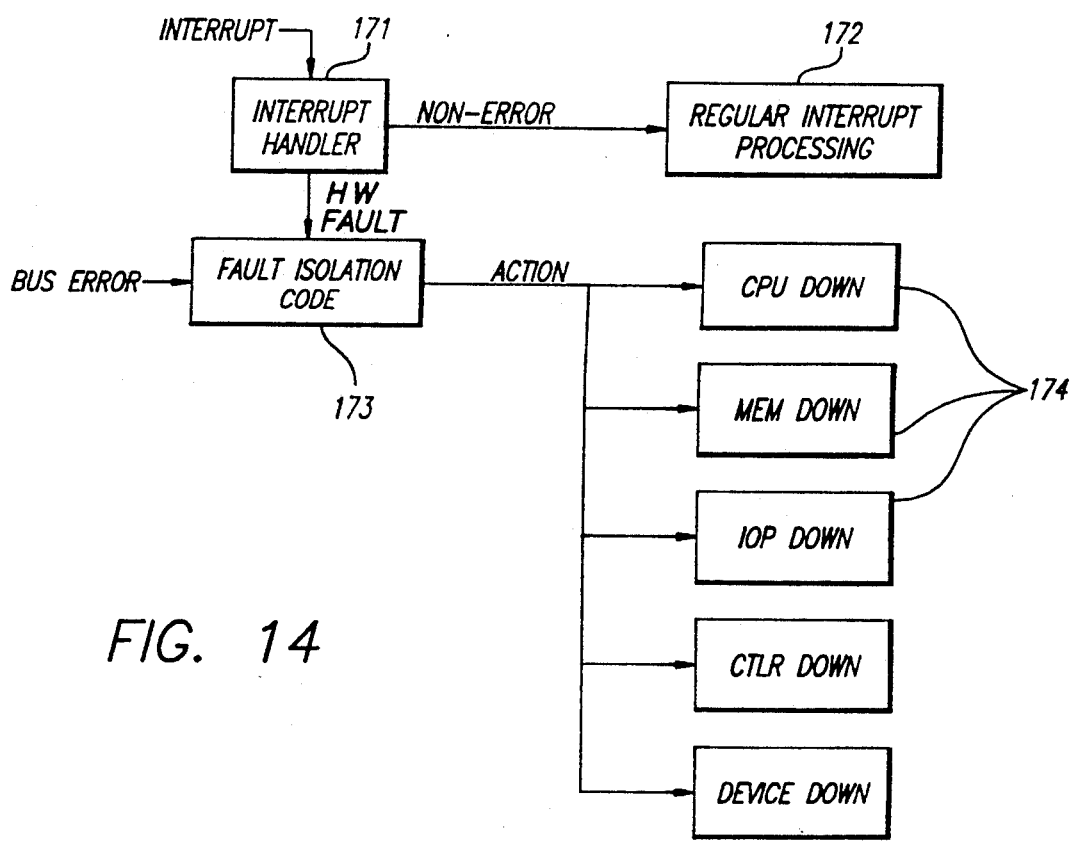
FIG. 14 is a flow chart showing the process of detecting an error, isolating the error to a faulty module and placing the module offline.
Figure 15:
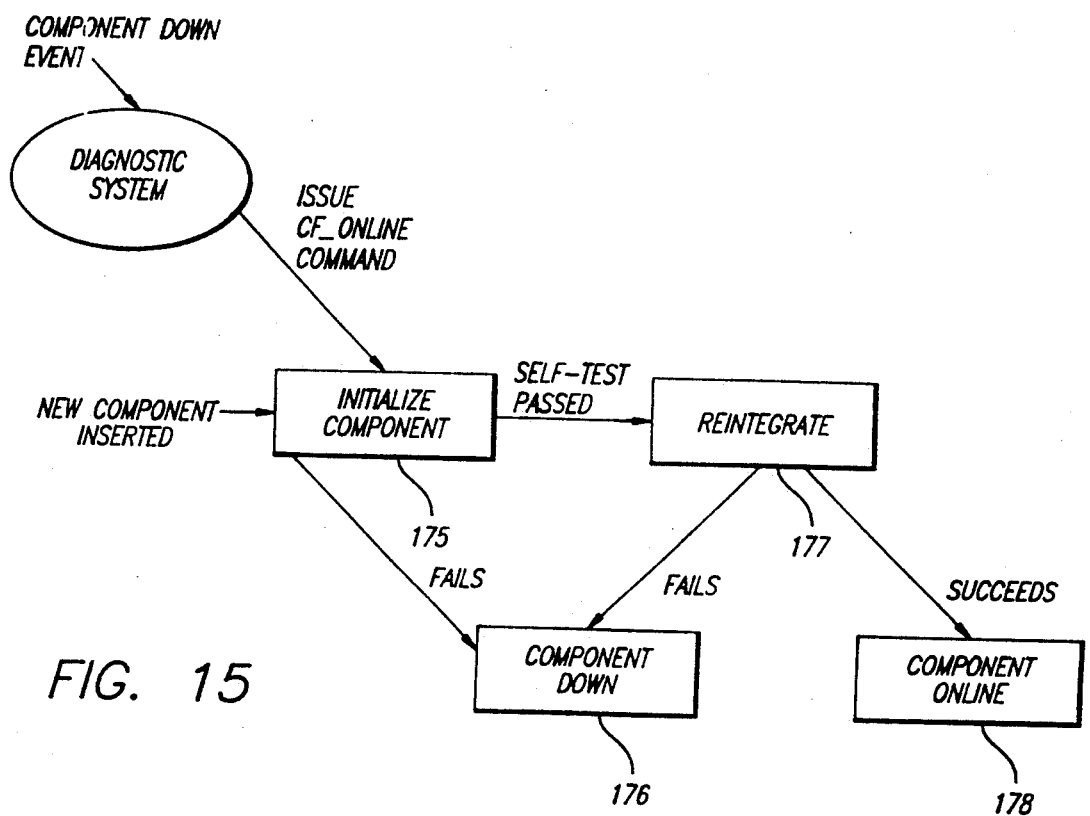
FIG. 15 is a flow chart showing the system recovery process when a replacement module is installed.

FIG. 14 shows the process of monitoring all modules for faults and placing a faulty module offline and FIG. 15 shows the reintegration process. In FIG. 14, the interrupt handler routines, indicated by block 171, evaluate an interrupt to see if it is produced by a hardware fault; if not, the ordinary interrupt processing sequences are entered as indicated by block 172, but, if so, then fault isolation code is entered as indicated by block 173. The fault isolation code can also be entered if a bus error is detected. The fault isolation code determines which component is down, as indicated by the blocks 174. As indicated in FIG. 15, when a new component (such as a memory module 14 or 15, for example) is inserted, as indicated by the block 175, the component undergoes it power-on self-test procedure; if it fails, the component-down state is entered again as indicated by block 176, but if it passes the reintegrate state is entered as indicated by the block 177. If reintegration fails then the component-down state is entered, or if it succeeds the component-online state 178 is entered.

A CPU is normally in the CPU Normal state, where the CPU is online and processing the same instruction stream as the other CPUs. When a CPU Board-Failed Status message arrives the kernel resets the failed CPU, forcing it into the CPU Dead state; a CPU comes out of reset in the CPU Dead state-the reset is either the result of a soft reset voted by the two remaining CPUs or a hard reset if the board is just plugged in. The voters 100 on the memory board 14 or 15 ignore CPUs 11, 12 or 13 that are not online. The remaining CPUs continue with normal operation while the dead CPU attempts to execute its power-on self-test. The other state shown is the CPU Reintable state, which the previously reset CPU automatically enters if it passes the power-on self-test; this CPU remains in this state until a user request is made to reintegrate it.

There are two major steps to the CPU reintegration procedure. The first is to resynch all the CPUs 11, 12 and 13, so the offline CPU is brought back online with all three executing the same code. The second major step is to restore local memory 16, i.e., ensure that the contents of the local memory 16 on the offline CPU is identical to that of the local memory 16 on the other CPUs.

The sequence used to resynch the CPUs is:
1. Kernel raises interrupt priority.
2. Kernel saves complete processor state in preparation for reset.
3. Kernel builds data structure to tell PROMs the desired return PC value.
4. Kernel resets all CPUs.
5. PROMs put CPU and coprocessor registers in a known state.
6. PROM code verifies the validity of the return PC value, and the code executed from the PROM is executed to jump to the return PC value location
7. Kernel restores complete CPU board state.

When a CPU fails, it is reset by the interrupt subsystem. If the failed CPU passes its power-on self-test it is eligible to be reintegrated by the remaining CPUs. Before the failed CPU can be brought back online it must be exactly in sync with the other CPUs, executing the exact same CPU cycles. The technique to accomplish this is to soft reset all CPUs. This returns all CPUs to the reset vector and allows the code in the PROMs 63 to resynch the CPUs, similar to a power-on reset.

The resynch operation occurs while the system is active, and so is fairly delicate. The code executed from the PROMs 63 for this purpose must distinguish between a power-on reset and a resynch, since a power-on reset resets all peripherals and runs memory tests which would destroy the current state of the kernel.

The reintegration code executed from the PROMs 63 keeps all the operating system dependencies in the kernel. Communication with the PROMs is through a data block, at a fixed physical memory address:

```
struct kernel_restart {
    ulong kr_magic;        /* magic number    */
    ulong kr_pc;           /* program counter to restart*/
    ulong kr_sp;           /* stack pointer   */
    ulong kr_checksum;     /* checksum of above */
};
```

The magic number and checksum are used by the PROM code to verify that the return PC is valid. The magic number will only be set during a reintegration attempt. Before jumping to the return PC the code executed from the PROMs 63 puts all CPUs 11, 12 and 13 in identical states, including zeroing all CPU and coprocessor 46 registers (otherwise a random value could cause all three CPUs to disagree during a vote).

Local memory 16 is restored by using the DMA engine 74 to copy each block of local memory 16 out to global memory 14, 15, and back again; this copy-back has the effect of copying good memory to the bad. This technique relies upon two features of the system construction; first, the contents of local memory 16 are preserved across a soft reset of the CPU, and, second, the DMA engine 74 always runs to completion-in the case of a vote error, the consensus of the data will be used, and at the end of the transfer status will indicate which CPU failed the vote.

Before executing the CPU resynch step the routine which performs the DMA page copy operations is itself copied to global memory, so when the CPUs 11, 12 and 13 come out of the resynch step they will be executing this copy routine in global memory 14, 15. The two good CPUs will have the kernel and data structures 143, 144 still intact. The bad CPU will have random bad data (some test pattern) in its local memory 16. After a DMA page copy to global memory an error in voter 100 indicating a vote fault by the bad CPU is anticipated on status lines 33 and does not mean the CPU being resynched should be put offline again. On the copy from global memory back to local memory 16, however, errors indicate a problem.

In embodiments where the amount of local memory 16 is large, the time required to copy every page may become unacceptably high. To reduce the copy time, the number of valid pages can be reduced by swapping processes out (either to disk or global memory). This reduces the number of pages that must be copied, at the expense of system response time before and after the reintegration.

If errors occur during the CPU resynch operation, all interrupts are masked by the PROM code before execution returns to the kernel. Once complete kernel state is restored the interrupt is lowered, and any pending error interrupts will be serviced in the usual manner. During restore of local memory 16, since the local memory is still intact on a majority of the CPUs it is possible to field non-maskable interrupts; this implies aborting the reintegration and putting the bad CPU back offline.

If local memory errors occur, differences in the contents of local memory are detected at voter 100 as vote faults during writes to global memory 14, 15. If the vote fault occurs while the write buffers 52 are enabled there is no reliable way to determine the faulty address so the error is considered fatal and the CPU board is reset. If the faulty address is known, an attempt to restore only that cell is made; if the restore is successful the board is not reset.

A parity-scrubber task is used to force vote-faults. The parity-scrubber runs in a very low-priority fashion, writing all pages from local memory 16 to a dummy page in global memory 14, 15. If any one of the three local memories 16 contains divergent data, a vote fault is detected. The parity scrubber runs with a frequency sufficient to drive toward zero the probability that all three CPUs will ever contain different data. A similar parity scrubber task runs in background at low priority to detect divergent data in global memory.

The process of detecting, isolating and placing a memory module offline is shown in FIG. 15. There are two broad types of memory board failures; page specific errors (e.g., parity) that indicate only a certain page in memory has failed, and general faults that indicate the entire board has failed. General failures will reset the memory board, requiring full reintegration before the board can be brought back online. Page specific errors are handled without taking the board offline.

It is desired to make the memory boards 14, 15, "fail fast". By this is meant that when an error is present in data stored in the global memory, it will be detected in a short time, even though the data may not be accessed for a long period-that is, latent faults are intentionally sought. Two kernel-level tasks are used to make the memories fail-fast. A primary/backup swap task periodically swaps the roles of primary and backup memories 14 and 15 to ensure that errors specific to one of these modes will be detected. A parity scrubber task, as before, ensures that all pages in global memory are read by the CPUs to force latent parity errors.

The memory-normal state means the memory board 14 or 15 is online, able to function as either primary or backup. The contents of the RAM 104 is identical to that of the other memory board. The primary-backup and parity-scrubber tasks are active (at low priority). The memory-offline state is the condition in which a memory board comes out of reset; this reset is either the result of a soft reset if the board has been operating or a hard reset if the board has just been plugged in. The primary-backup and parity-scrubber tasks are turned off, since they have succeeded in crashing one memory and it is necessary that they be prevented from crashing the other. A memory board is put in the revive state by a user request to start reintegration. This revive state is a special write-only limbo state in which the memory is being prepared for reintegration. The memory board in the revive state participates in all write operations and performs write error checking as though it were online, but it does not participate in or perform error checking during reads.

At the time a memory board 14 or 15 is put in the revive state its RAM 104 is completely uninitialized. Before it can be brought back online the revive memory must contain exactly the same data as the good memory board. The reintegration process takes two passes, with each of these passes involving copying every page of memory to itself, which has the effect of reading from the good memory and writing back to both, thus copying all of the memory from the good board 14 or 15 to the revive board. The sole purpose of the first pass is to put valid parity in every location in memory so that the second pass can proceed reliably. The memory board is invisible to the I/O buses 24 and 25 during this step. The memory board 14 or 15 which is being reintegrated always returns good status to the CPUs via lines 33 during this first step. The second pass is the reintegration step, during which CPUs and I/O buses 24 and 25 write to both memory boards 14 and 15; any parity errors indicate true errors.

Depending upon the size of the global memories 14 and 15, the amount of time required to run the two reintegration passes can be significant. The user can specify how much of the total CPU resources are dedicated to the reintegration passes over a given period of time. The actual page copy is done by the kernel with priority set high and with exclusive ownership of the I/O buses 24 and 25; the priority is raised to prevent an interrupt routine from changing the data before it can be written back, and the access from the I/O buses 24 and 25 is locked out to prevent an I/O processor 26, 27 from changing data before it can be written back. The write-protect bit for a given page must be disabled while that page is being copied. The page copy will run whenever the system is idle and at intervals specified by the user in selecting the memory reintegration policy; the block size can be selected, e.g., 128, 1024 or 4096 bytes transferred before the CPU is relinquished for other tasks, and the gap between blocks selected so the ratio of reintegration task to other tasks is defined.

If a page-specific error occurs, a set number of attempts are made to restore the page by rewriting it from the other memory (just as in full memory revive). For soft errors this corrects the problem. The memory is made primary and the page is tested before a try is considered a success. If a retry fails the memory board is reset and must be reintegrated.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of operating a computer system having multiple CPUs executing the same instruction stream, the CPUs each having local memory and also each accessing multiple global memory units storing identical data, comprising the steps of:
   a) detecting an error in one of said CPUs;
   b) isolating said one CPU from the system and continuing to execute said instruction stream and accessing said global memory units by the other ones of said CPUs;
   c) reintegrating said one CPU after rendering said CPU operative by first bringing said one CPU into sync with said other ones of said CPUs by soft-resetting all of said multiple CPUs prior to continuing normal operation of said multiple CPUs, said soft-resetting non-destructively preserving the current state and the local memory of each said multiple CPU, then restoring the state and the local memory of said one CPU to be identical to the state and the local memory of the said other ones of the CPUs.

2. A method according to claim 1 wherein any one of the global memory units may be designated as primary for the purpose of supplying read data to said multiple CPUs and the others of the said global memory units are designated backup.

3. A method according to claim 1 wherein said step of restoring the state and the local memory includes;
   a) copying each state variable of the other ones of the CPUs to global memory and then copying each state variable from global memory to the appropriate state register in all of said multiple CPUs;
   b) copying a portion of local memory of the other ones of the CPUs to global memory and then copying said portion from global memory to local memory in all of said multiple CPUs;
   c) repeating step b) for different portions of local memory of the other ones of the CPUs until all variables stored in local memory of the other ones of the CPUs have been copied to global memory and then copied from global memory to all of said multiple CPUs.

4. A method according to claim 1 including the steps of;
   a) removing said one CPU from said computer system without shutdown of said system and while the other ones of the CPUs continue execution of said instruction stream;
   b) replacing said one CPU in said computer system also without shutdown and while instruction execution continues.

5. A method according to claim 1 wherein there are three said CPUs and two said global memory units.

6. A method according to claim 1 comprising the steps of:
 a) detecting an error in one of said global memory units;
 b) isolating said one of said global memory units and continuing to execute said instruction stream and accessing a remaining global memory unit of said global memory units;
 c) reintegrating said one global memory unit by restoring the state and memory contents of said one global memory unit to be identical to the state and memory contents of each remaining global memory unit of the global memory units;
 d) and thereafter continuing to execute said instruction stream accessing said multiple global memory units including said one global memory unit.

7. A method according to claim 6 wherein there are two said global memory units either one of which is designated primary and the other is designated backup.

8. A method according to claim 9 wherein said steps of reading each global memory unit processor board state variable and reading each local memory data word stored in global memory includes checking the validity of the data in each of said multiple global memory units.

9. A method according to claim 6 wherein said step of restoring the state and the memory contents of global memory includes:
 a) configuring said one global memory unit to ignore all access requests from I/O Processors;
 b) reading each global memory unit processor board state variable from the primary global memory unit to said multiple CPUs and storing said processor board state variable from the multiple CPUs to all global memory units including said one global memory unit;
 c) reading each local memory data word stored in the primary global memory unit to said multiple CPUs and storing said local memory data word from the multiple CPUs to all global memory units including said one global memory unit;
 d) repeating step c;
 e) configuring said one global memory unit to execute all access requests from I/O Processors.

10. A method according to claim 8 including the step of changing the designations of the global memory units if an error is detected in the global memory unit previously designated as primary.

11. A fault-tolerant computer system, comprising:
 a) first, second and third CPUs of substantially identical configuration each having local memory, said first, second and third CPUs executing substantially the same instruction stream;
 b) first and second global memory modules of substantially identical configuration, said first and second memory modules storing substantially the same data;
 c) busses coupling each of the first, second and third CPUs individually to each of said first and second global memory modules whereby said first, second and third CPUs access said first and second global memory modules separately and in duplicate;
 d) said CPUs continuing to execute said instruction stream even though one of said first, second and third CPUs is inoperative and continuing to access one of said first and second global memory modules even though the other is inoperative;
 e) said one of said first, second and third CPUs which is inoperative being replaceable into the system without shutdown of the system while the other ones of said CPUs continue execution of said instruction stream;
 f) said one of said first, second and third CPUs which is inoperative being rendered operative and restored to normal function in the system without shutdown of the system while the other ones of said CPUs continue execution of said instruction stream, all of said first, second and third CPUs being soft-reset prior to restoration of said inoperative CPU, said soft-reset non-destructively preserving the current state and local memory of said first, second and third CPUs;
 g) said other of the global memory modules which is inoperative being replaceable into the system without shutdown of the system while said first, second and third CPUs continue to access the global memory module which is operative;
 h) said other of the global memory modules which is inoperative being rendered operative and restored to normal function in the system without shutdown of the system while said first, second and third CPUs continue to access the global memory module which is operative.

12. A system according to claim 11 wherein said first, second and third CPUs are operating on independent clocks so that said execution is asynchronous.

13. A system according to claim 11 wherein either of said global memory modules is designated as primary and the other is designated backup, and wherein write operations by the CPUs are executed in both of said global memory modules but in read operations said CPUs receive data from only the primary global memory module; and wherein the backup global memory module may be designated primary and the primary may be designated backup, at any time.

14. A system according to claim 11 wherein said first, second and third CPUs are loosely synchronized upon the event of a reference to the global memory modules.

15. A system according to claim 14 wherein said first, second and third CPUs are loosely synchronized upon the event of a reference to the global memory modules by detecting an access to said first and second global memory modules and stalling any CPUs for which the access occurs earlier to wait until the last one of said CPUs executes said access, then allowing the access to occur.

16. A system according to claim 14 wherein said global memory module include means for voting said reference to said global memory modules, and wherein data is voted only for writes in said means for voting said references to said global memory modules, and addresses and commands are voted for both read and write references to said global memory modules.

17. A system according to claim 11 further including:
 i) a first input/output bus coupled to said first global memory module and a second input/output bus coupled to said second global memory module; and
 j) a first input/output processor coupled to both said first and second input/output busses, and a second input/output processor coupled to both said first and second input/output busses.

18. A system according to claim 17 further including:
 k) one I/O bus coupled to said first input/output processor and a second I/O bus coupled to said second input/output processor;

l) one or more Bus Interface Modules coupled to both said first and second I/O busses m) one I/O Controller coupled to each Bus Interface Module n) one or more I/O devices coupled to each I/O Controller.

19. A system according to claim 18 wherein a faulty I/O Controller can be taken off-line and placed in reset.

20. A system according to claim 18 wherein a faulty disk drive module attached to an I/O Controller can be isolated and powered down until said disk drive is removed and replaced.

21. A system according to claim 18 further including:

o) dual power subsystems providing normal operational power for the redundant modules in the system such that normal system operation can continue in the event of a failure of one power subsystem component;

p) dual battery backup power subsystems providing sufficient power to allow graceful shutdown of the system in the event of a loss of mains power even when one of said battery backup power subsystems is inoperative;

q) redundant cooling systems with cooling efficiency sensors on each cooling module such that the efficiency of all remaining cooling modules can be increased to compensate for a faulty cooling module.

22. A system according to claim 18 further including additional input/output processors, each coupled to an additional I/O bus.

23. A system according to claim 22 wherein each said input/output processor functions as an independent entity providing controlled access between said assigned I/O Controllers and said global memory modules.

24. A system according to claim 18 wherein:

a) each said I/O controller is assigned to one of the two said input/output processors coupled via said I/O bus and said Bus Interface Module; and b) each input/output processor coordinates global memory accesses for its assigned I/O controllers; and c) each input/output processor monitors said assigned I/O Controllers for incorrect behavior and reports software and firmware errors associated with each said assigned I/O controller to the CPUs via interrupts.

25. A system according to claim 24 wherein a faulty input/output processor can be isolated, held in a Reset state, and its assigned I/O Controllers reassigned to the other input/output processor which is coupled to the said I/O Controllers.

26. A method of operating a computer system including the steps of:

a) executing the same instruction stream in first, second and third CPUs;

b) generating global memory accesses in each of said first, second and third CPUs at separate first, second and third global memory access busses;

c) storing duplicative data in first and second global memory modules having substantially identical address spaces within the address range of said CPUs, including executing accesses to each one of said first and second global memory modules via said first, second and third global memory access busses;

d) voting each one of said accesses in said first and second global memory modules when received from said first, second and third global memory access busses, said voting including comparing information representing said accesses;

e) allowing said accesses to be completed only where at least two of said global memory access busses present the same such information;

f) placing offline one of said first, second and third CPUs when a global memory access from said one is different from the other two upon said voting, then placing said one CPU back online without shutdown of the system after said one of the CPUs is rendered operative, said first, second and third CPUs being soft-reset such that the current state and local memory of each of said first, second and third CPUs are non-destructively preserved prior to continuing normal operation of said first, second and third CPUs.

27. A method according to claim 26 including the step of placing offline one of said first and second global memory modules when an error is detected in global memory access, then replacing said one of said global memory modules into the system without shutdown of the system after said one of the global memory modules is rendered operative.

28. A method according to claim 26 including the step of synchronizing said first, second and third CPUs whereby said CPUs are substantially simultaneously executing the same instruction stream, and wherein said step of synchronizing said CPUs includes stalling execution of global memory accesses until all three of the first, second and third CPUs are executing the same global memory access at the same time.

29. A method according to the claim 28 wherein said step of synchronizing also includes timing the implementation of external interrupts of the CPUs so that all three of the first, second and third CPUs are executing the same instruction at the time the interrupt is presented.

* * * * *